US012574893B2

(12) United States Patent
    Guo

(10) Patent No.: US 12,574,893 B2
(45) Date of Patent: Mar. 10, 2026

(54) METHOD AND SYSTEM FOR IMPROVED POSITIONING MEASUREMENT

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 304 days.

(21) Appl. No.: 18/238,218

(22) Filed: Aug. 25, 2023

(65) Prior Publication Data

US 2023/0413221 A1 Dec. 21, 2023

Related U.S. Application Data

(63) Continuation of application No. PCT/IB2022/053084, filed on Apr. 1, 2022.

(60) Provisional application No. 63/170,344, filed on Apr. 2, 2021, provisional application No. 63/169,540, filed on Apr. 1, 2021.

(51) Int. Cl.
    *H04W 64/00* (2009.01)
    *H04W 24/10* (2009.01)

(52) U.S. Cl.
    CPC ......... *H04W 64/003* (2013.01); *H04W 24/10* (2013.01); *H04W 64/006* (2013.01)

(58) Field of Classification Search
    None
    See application file for complete search history.

(56) References Cited

U.S. PATENT DOCUMENTS

| | | | |
|---|---|---|---|
| 9,801,171 B2 | 10/2017 | Kim | |
| 10,433,291 B2 | 10/2019 | Radulescu | |
| 11,044,581 B2 | 6/2021 | Manolakos | |
| 2015/0304994 A1 | 10/2015 | Kim | |

(Continued)

FOREIGN PATENT DOCUMENTS

| | | |
|---|---|---|
| CN | 111585624 A | 8/2020 |
| EP | 4021057 A1 | 6/2022 |

(Continued)

OTHER PUBLICATIONS

International Search Report in the international application No. PCT/IB2022/053084, mailed on Jul. 28, 2022. 4 pages.

(Continued)

*Primary Examiner* — Adolf Dsouza
(74) *Attorney, Agent, or Firm* — BAYES PLLC

(57) ABSTRACT

A UE receives configuration information for transmission of Sounding Reference Signal (SRS) resources for positioning to be associated with a higher layer parameter, which has a plurality of values respectively corresponding to a plurality of transmit (Tx) timing offsets of the UE. The UE transmits SRS resources for positioning associated with the higher layer parameter according to the configuration information to a plurality of TRPs. The plurality of values of the higher layer parameter are used for calculating positioning measurements between the UE and the plurality of TRPs based on the plurality of Tx timing offsets of the UE, and the calculated positioning measurements are used for determining the position of the UE.

20 Claims, 10 Drawing Sheets

(56)         References Cited

U.S. PATENT DOCUMENTS

| | | | |
|---|---|---|---|
| 2016/0095092 A1 | 3/2016 | Khoryaev | |
| 2017/0251456 A1 | 8/2017 | Radulescu | |
| 2017/0251499 A1 | 8/2017 | Radulescu | |
| 2020/0137715 A1 | 4/2020 | Edge et al. | |
| 2020/0236507 A1* | 7/2020 | Manolakos | H04W 4/025 |
| 2020/0259683 A1 | 8/2020 | Manolakos et al. | |
| 2020/0314860 A1* | 10/2020 | Zhou | H04W 72/23 |
| 2020/0351129 A1* | 11/2020 | Kwak | H04W 76/27 |
| 2020/0396729 A1 | 12/2020 | Wu | |
| 2021/0336820 A1* | 10/2021 | Lim | H04W 80/02 |
| 2022/0209997 A1 | 6/2022 | Manolakos et al. | |
| 2022/0232573 A1* | 7/2022 | Farag | H04W 72/0446 |
| 2022/0236404 A1 | 7/2022 | Gunnarsson et al. | |
| 2023/0111063 A1* | 4/2023 | Ji | H04L 5/0012 |
| | | | 370/329 |

FOREIGN PATENT DOCUMENTS

| | | | |
|---|---|---|---|
| WO | 2020163597 A1 | 8/2020 | |
| WO | 2020229972 A1 | 11/2020 | |
| WO | 2021012981 A1 | 1/2021 | |
| WO | 2021038655 A1 | 3/2021 | |

OTHER PUBLICATIONS

Written Opinion of the International Search Authority in the international application No. PCT/IB2022/053084, mailed on Jul. 28, 2022. 4 pages.

Supplementary European Search Report in the European application No. 22779300.7, mailed on Jun. 13, 2024. 9 pages.

* cited by examiner

200

Figure 4A:
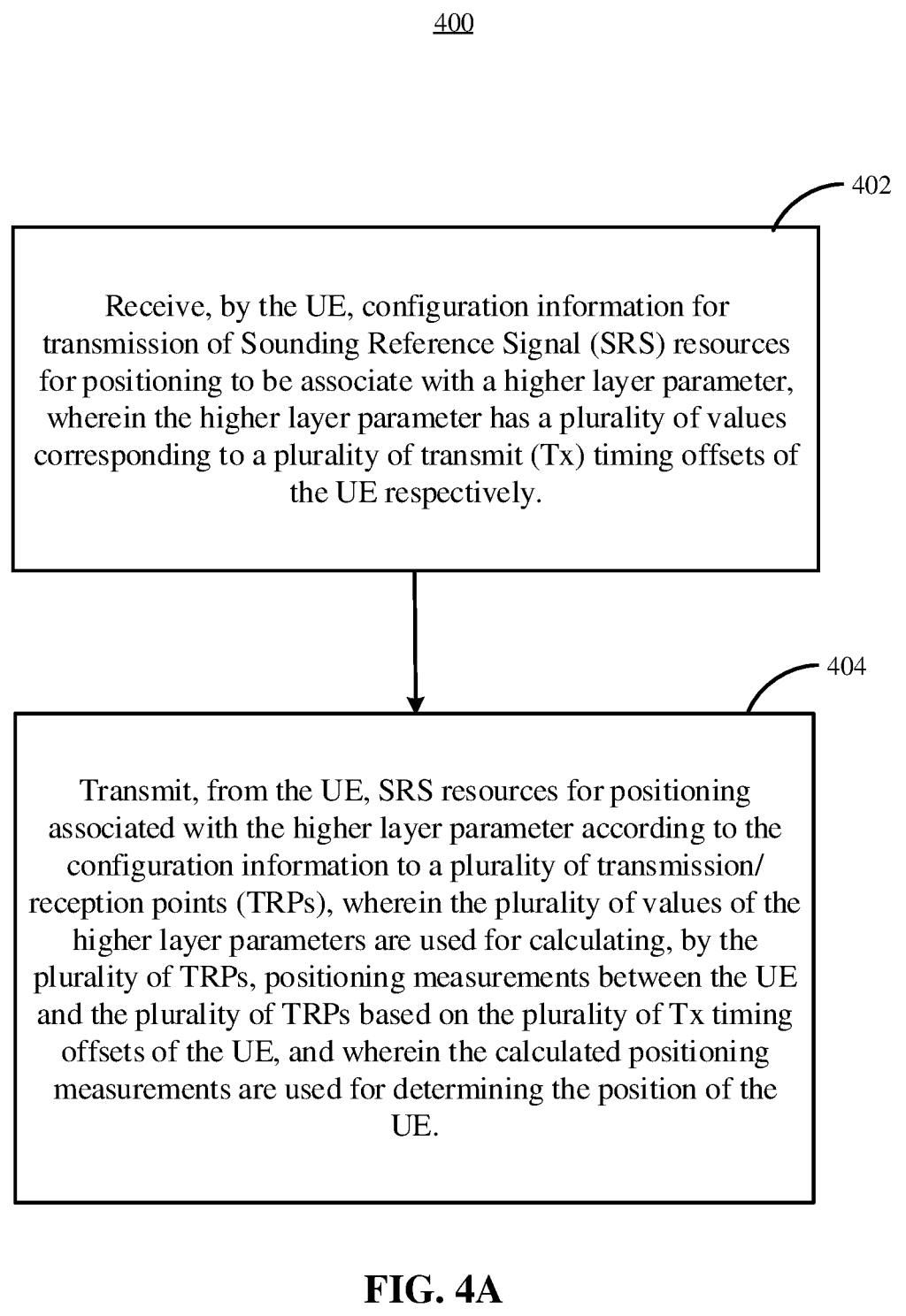

400

402

Receive, by the UE, configuration information for transmission of Sounding Reference Signal (SRS) resources for positioning to be associate with a higher layer parameter, wherein the higher layer parameter has a plurality of values corresponding to a plurality of transmit (Tx) timing offsets of the UE respectively.

404

Transmit, from the UE, SRS resources for positioning associated with the higher layer parameter according to the configuration information to a plurality of transmission/reception points (TRPs), wherein the plurality of values of the higher layer parameters are used for calculating, by the plurality of TRPs, positioning measurements between the UE and the plurality of TRPs based on the plurality of Tx timing offsets of the UE, and wherein the calculated positioning measurements are used for determining the position of the UE.

Figure 4B:
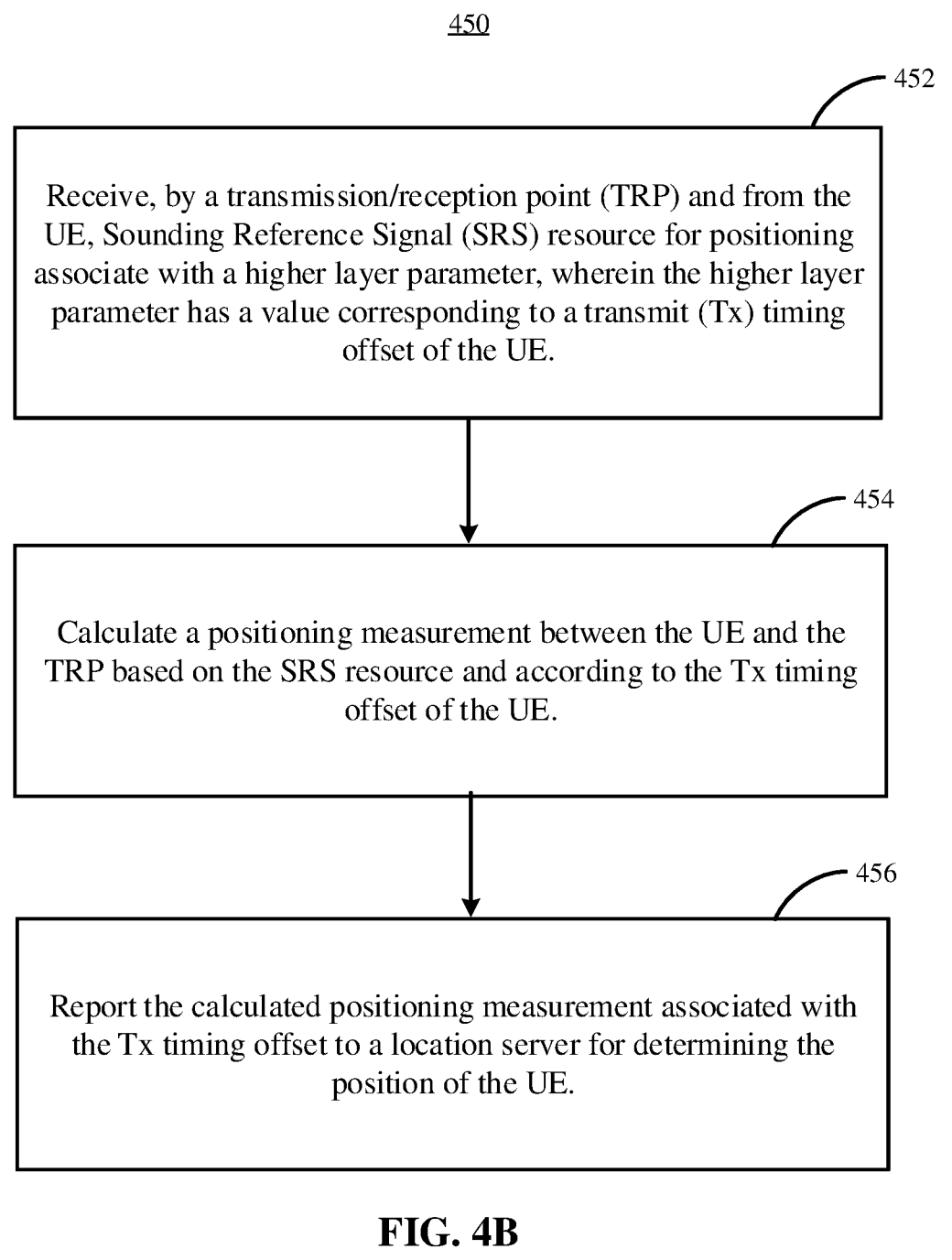

Receive, by a transmission/reception point (TRP) and from the UE, Sounding Reference Signal (SRS) resource for positioning associate with a higher layer parameter, wherein the higher layer parameter has a value corresponding to a transmit (Tx) timing offset of the UE.

454

Calculate a positioning measurement between the UE and the TRP based on the SRS resource and according to the Tx timing offset of the UE.

456

Report the calculated positioning measurement associated with the Tx timing offset to a location server for determining the position of the UE.

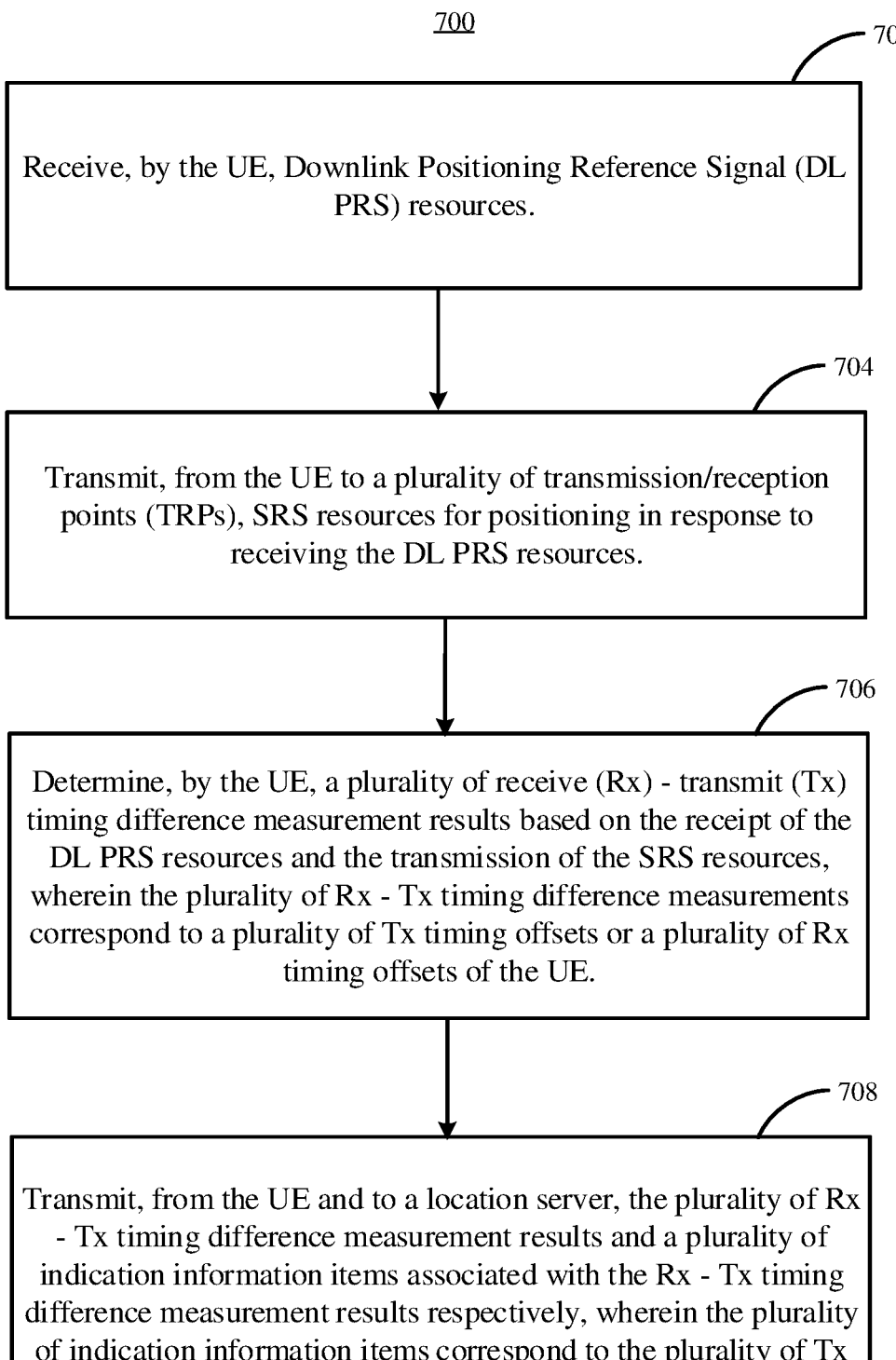

700

702

Receive, by the UE, Downlink Positioning Reference Signal (DL PRS) resources.

704

Transmit, from the UE to a plurality of transmission/reception points (TRPs), SRS resources for positioning in response to receiving the DL PRS resources.

706

Determine, by the UE, a plurality of receive (Rx) - transmit (Tx) timing difference measurement results based on the receipt of the DL PRS resources and the transmission of the SRS resources, wherein the plurality of Rx - Tx timing difference measurements correspond to a plurality of Tx timing offsets or a plurality of Rx timing offsets of the UE.

708

Transmit, from the UE and to a location server, the plurality of Rx - Tx timing difference measurement results and a plurality of indication information items associated with the Rx - Tx timing difference measurement results respectively, wherein the plurality of indication information items correspond to the plurality of Tx timing offsets or the plurality of Rx timing offsets of the UE.

FIG. 7

| Display 802 | Camera 804 | Sensor 806 | I/O Interface 808 |

Memory/storage 816

Application circuitry 810

Baseband circuitry 812

RF circuitry 814

METHOD AND SYSTEM FOR IMPROVED POSITIONING MEASUREMENT

CROSS-REFERENCE TO RELATED APPLICATIONS

This application is a continuation of International Patent Application No. PCT/IB2022/053084 filed on Apr. 1, 2022, which claims the benefit of priorities to U.S. Provisional Patent Applications No. 63/169,540, filed on Apr. 1, 2021, and U.S. Provisional Patent Applications No. 63/170,344, filed on Apr. 2, 2021, all of which are incorporated herein by reference in their entireties.

BACKGROUND

Positioning technology of a user equipment (UE), e.g., a mobile device such as a cellular telephone or smartphone, may be important to various applications including wireless communication, location identification, navigation, and various Internet services, etc. The 5G New Radio (NR) system can support positioning technology using various positioning solutions. NR based positioning solutions may involve function entities including one or more UEs, one or more Transmission/Reception Points (TRPs), and a location server such as a Location Management Function (LMF). A UE can measure downlink positioning reference signal (DL PRS) resources sent from multiple TRPs, or transmit sounding reference signal (SRS) resources for positioning. Multiple TRPs are involved for determining the location of a UE. For example, a respective TRP can transmit a DL PRS to the UE, or receive and measure a SRS, transmitted by the UE, for positioning. The time difference measurements can be used by the LMF for determining the location of the UE. As location-based functions of the UE become more popular and important, there is a need for improved accuracy in positioning of the UE.

SUMMARY

The present disclosure relates generally to estimation of a position of user equipment (UE) and, more particularly, to an apparatus, a system, and method of wireless communication based on positioning signals for improved positioning accuracy.

Consistent with embodiments of the present disclosure, a method is provided for providing positioning of a user equipment (UE), comprising: receiving, by the UE, configuration information for transmission of Sounding Reference Signal (SRS) resources for positioning to be associated with a higher layer parameter, wherein the higher layer parameter has a plurality of values respectively corresponding to a plurality of transmit (Tx) timing offsets of the UE; and transmitting, from the UE, SRS resources for positioning associated with the higher layer parameter according to the configuration information to a plurality of transmission/reception points (TRPs), wherein the plurality of values of the higher layer parameter are used for calculating, by the plurality of TRPs, positioning measurements between the UE and the plurality of TRPs based on the plurality of Tx timing offsets of the UE, and wherein the calculated positioning measurements are used for determining the position of the UE.

There is also provided a user equipment (UE) including a memory; at least one transceiver; and at least one processor communicatively coupled to the memory and the at least one transceiver, and configured to receive configuration information for transmission of Sounding Reference Signal (SRS) resources for positioning to be associated with a higher layer parameter, wherein the higher layer parameter has a plurality of values respectively corresponding to a plurality of transmit (Tx) timing offsets of the UE; and transmit SRS resources for positioning associated with the higher layer parameter according to the configuration information to a plurality of transmission/reception points (TRPs), wherein the plurality of values of the higher layer parameter are used for calculating, by the plurality of TRPs, positioning measurements between the UE and the plurality of TRPs based on the plurality of Tx timing offsets of the UE, and wherein the calculated positioning measurements are used for determining the position of the UE There is also provided a transmission/reception point (TRP), comprising: a memory; at least one transceiver; and at least one processor communicatively coupled to the memory and the at least one transceiver, and configured to: receive, by the TRP and from a user equipment (UE), a Sounding Reference Signal (SRS) resource for positioning associate with a higher layer parameter, wherein the higher layer parameter has a value corresponding to a transmit (Tx) timing offset of the UE; calculate a positioning measurement between the UE and the TRP based on the SRS resource and according to the Tx timing offset of the UE; and report the calculated positioning measurement associated with the Tx timing offset to a location server for determining the position of the UE.

It is to be understood that both the foregoing general description and the following detailed description are exemplary and explanatory only and are not restrictive of the disclosure, as claimed. Other features and advantages of the present disclosure will become apparent by a review of the specification, claims, and appended figures.

BRIEF DESCRIPTION OF THE DRAWINGS

FIG. 4A is a flowchart illustrating an example method for providing positioning of a UE, in accordance with embodiments of the present disclosure.

FIG. 4B is a flowchart illustrating another example method for providing positioning of a UE, in accordance with embodiments of the present disclosure.

FIG. 7 is a flowchart illustrating another example method for providing positioning of a UE, in accordance with embodiments of the present disclosure.

DETAILED DESCRIPTION

Figure 1:
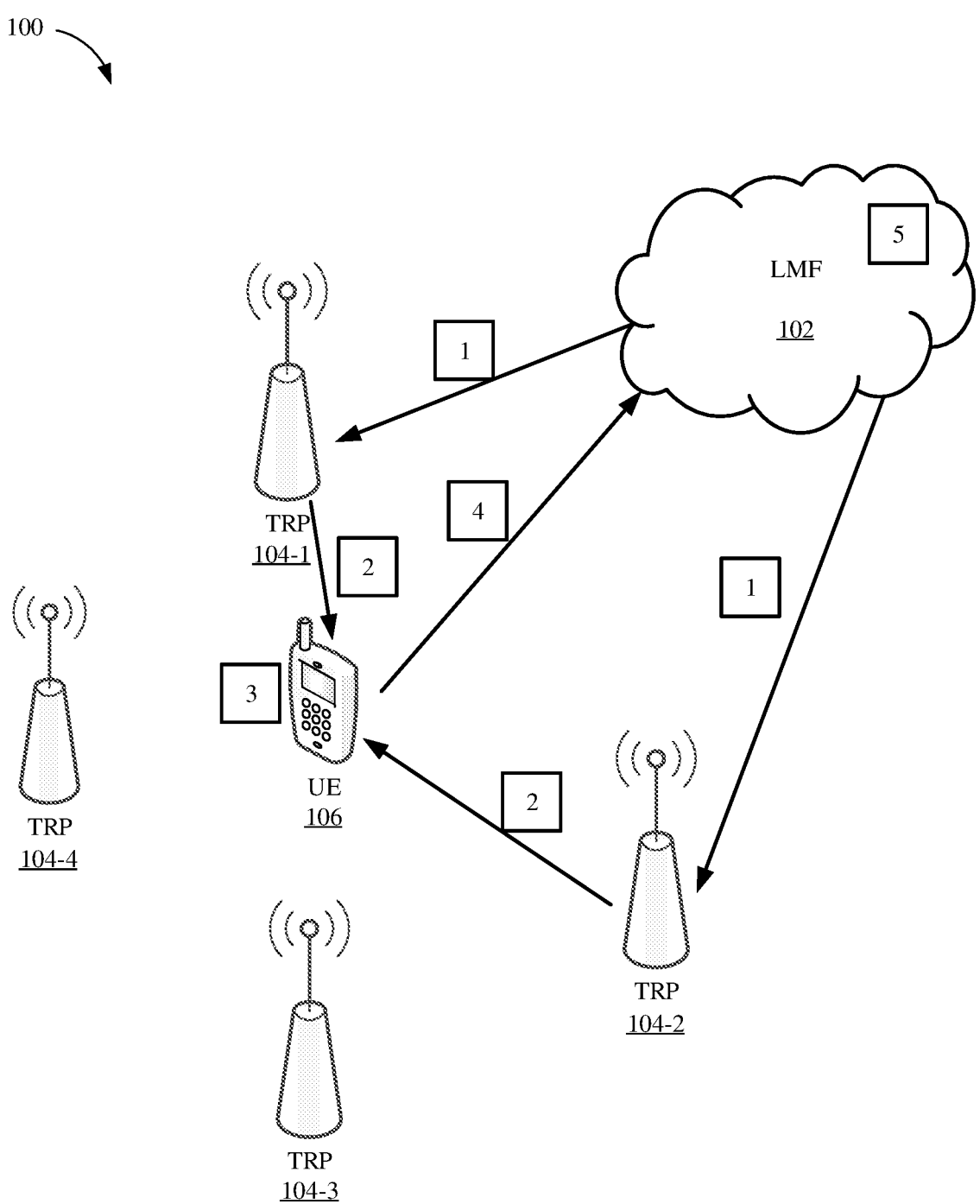
FIG. 1 is a schematic diagram illustrating an example of a New Radio (NR) positioning procedure based on Downlink (DL) measurement, in accordance with embodiments of the present disclosure.

The following detailed description refers to the accompanying drawings. Wherever possible, the same reference numbers refer to the same or similar parts. While several illustrative embodiments are described herein, modifications, adaptations and other implementations are possible. For example, substitutions, additions, or modifications may be made to the components illustrated in the drawings. Accordingly, the following detailed description is not limited to the disclosed embodiments and examples. Instead, the proper scope is defined by the appended claims.

Positioning technology is important for various wireless communications systems and navigation systems. The $5^{th}$ Generation New Radio (5G NR) system can support positioning technology. The $3^{rd}$ Generation Partnership Project (3GPP) release 16 can provide various positioning solutions, such as Downlink Time Difference of Arrival (DL TDOA) method, Uplink Time Difference of Arrival (UL TDOA) method, Multiple Roundtrip Time (multi-RTT) method, Downlink Angle of Departure (DL-AoD) method, Uplink Angle of Arrival (UL AoA) method, or Enhanced Cell ID (E-CID) method.

In the $3^{rd}$ Generation Partnership Project New Radio (3GPP NR), a Downlink Positioning Reference Signal (DL PRS) was introduced to support downlink positioning measurement. A Sounding Reference Signal (SRS) for positioning was introduced to support uplink positioning measurement. For example, 3GPP NR release 16 can support multiple measurements for positioning such as a Downlink Reference Signal Time Difference (DL RSTD) measured from the DL PRS, an Uplink Relative Time of Arrival (UL RTOA) measured from the SRS for positioning, a User Equipment (UE) Rx-Tx time difference, a Next generation NodeB (gNB) Rx-Tx time difference, a Downlink Positioning Reference Signal Reference Signal Received Power (DL PRS RSRP), an Uplink Sounding Reference Signal Reference Signal Received Power (UL SRS RSRP), or a UL AoA.

FIG. 1 is a schematic diagram illustrating an example of a New Radio (NR) positioning procedure 100 based on Downlink (DL) measurement, in accordance with embodiments of the present disclosure. In some embodiments, NR positioning procedure 100 involves a Location Management Function (LMF) 102, a plurality of Transmission/Reception Points TPRs 104-1, 104-2, 104-3, 104-4 . . . , and a user equipment (UE) 106 that are in wireless communication with each other.

In some embodiments, NR positioning procedure 100 starts from process 1 in FIG. 1, where LMF 102 and TRPs (e.g., TRP 104-1, 104-2 . . . ) coordinate DL PRS configurations. In process 2, a respective TRP, e.g., TRP 104-1 or 104-2, transmits the DL PRS resource according to the configuration to UE 106. In process 3, the UE measures DL PRS resources transmitted from TRPs, and then measures the DL PRS RSRP and/or DL RSTD. In some embodiments, UE 106 measures arrival timing, signal RSRP, or signal arrival angles which can be used to estimate a location of UE 106. As shown in process 4 of FIG. 1, UE 106 then reports the positioning measurement results to LMF 102, which operates as a location server. In process 5, LMF 102 calculates the location of UE 106 based on the reported positioning measurement results.

Figure 2:
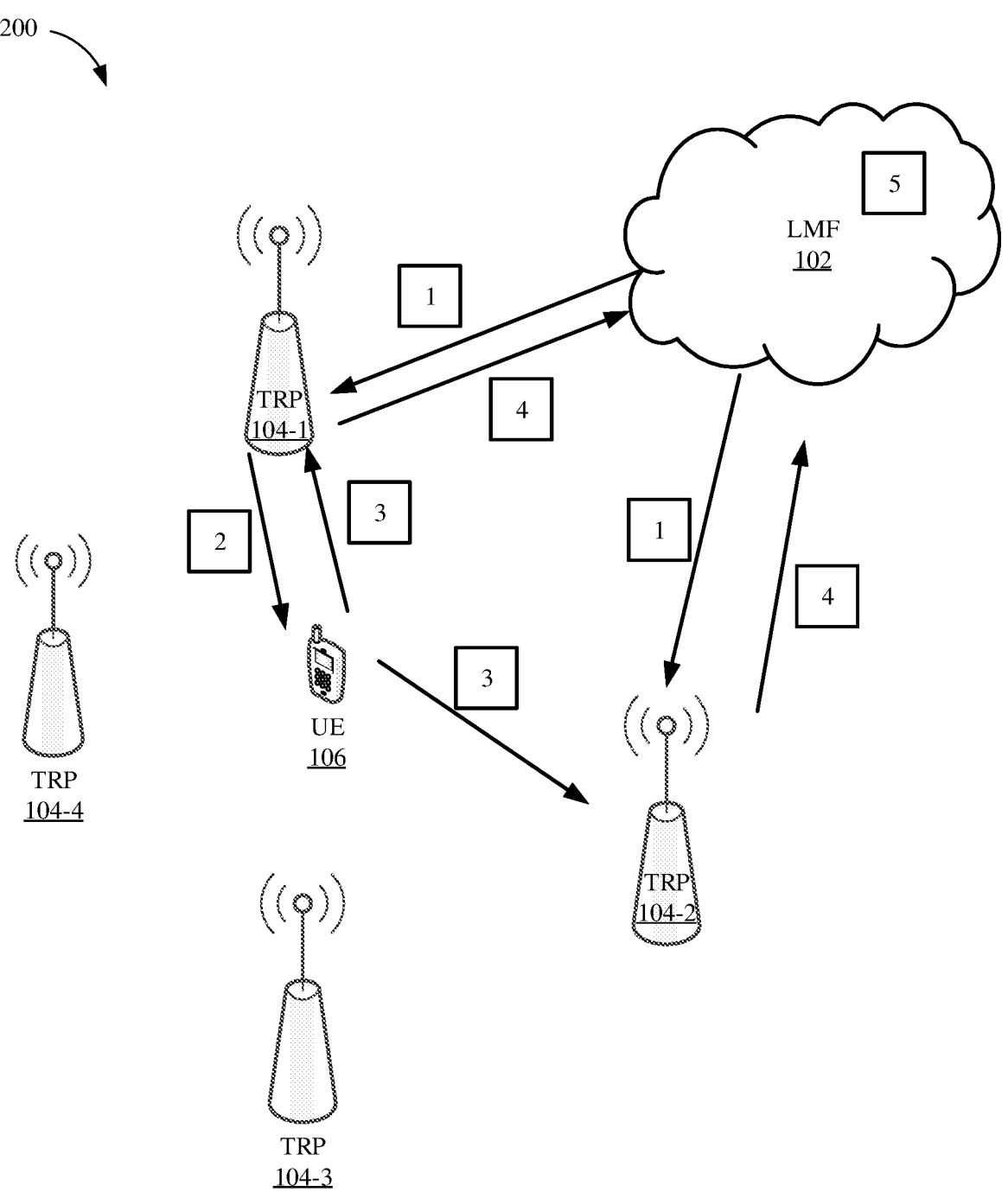
FIG. 2 is a schematic diagram illustrating an example of an NR positioning procedure based on uplink (UL) measurement, in accordance with embodiments of the present disclosure.

FIG. 2 is a schematic diagram illustrating an example of a New Radio (NR) positioning procedure 200 based on uplink (UL) measurement, in accordance with embodiments of the present disclosure. In some embodiments, NR positioning procedure 200 involves LMF 102, the plurality of TPRs 104-1, 104-2, 104-3, 104-4 . . . , and UE 106 that are in wireless communication as shown in FIG. 2.

In some embodiments, NR positioning procedure 100 starts from process 1 where LMF 102 and TRPs 104 (e.g., TRP 104-1, 104-2 . . . ) coordinate the configuration of an SRS for positioning. In process 2, the serving cell, e.g., TRP 104-1, provides the configuration of the SRS for positioning to UE 106. In process 3, UE 106 transmits the SRS for positioning according to the configuration to a respective TRP, e.g., TRP 104-1 or 104-2. In process 4, a respective TRP, such as TRP 104-1 or 104-2, receives the SRS for positioning from UE 106 and calculates the positioning measurements, including UL AoA, UL SRS RSRP, and/or UL RTOA. The respective TRP then reports the uplink measurement results to LMF 102. In process 5, LMF 102 calculates the location of UE 106 based on the reported positioning measurement results.

Figure 3:
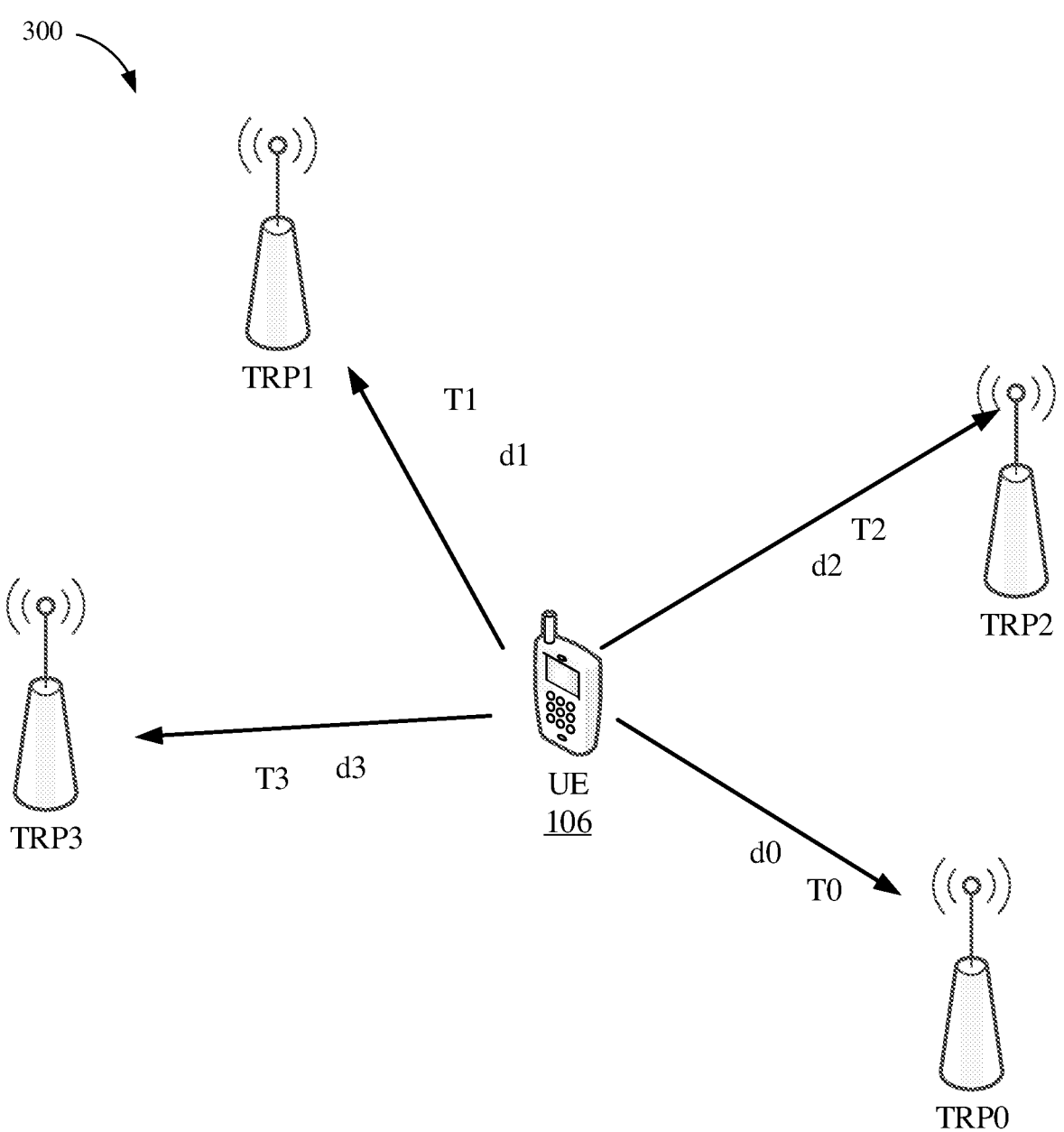
FIG. 3 is a schematic diagram illustrating an example of an NR UL Time Difference of Arrival (TDOA) positioning method, in accordance with embodiments of the present disclosure.

FIG. 3 is a schematic diagram illustrating an example of an NR UL TDOA positioning procedure 300, in accordance with embodiments of the present disclosure. In some embodiments as shown in FIG. 3, four TRPs 104, such as TRP0, TRP1, TRP2, and TRP3 (e.g., TRP 104-1, TRP 104-2, TRP 104-3, TRP 104-4 of FIG. 1 or 2), are used to determine the location of one UE, e.g., UE 106. In some embodiments, UE 106 may send an SRS for positioning to the four TRPs 104. A respective TRP may measure the UL RTOA of UE 106. As shown in FIG. 3, the distance between UE 106 and the four TRPs 104 are d0, d1, d2 and d3, respectively. In some embodiments, uplink signal transmission times corresponding to the four TRPs 104 are T0, T1, T2 and T3, respectively. Assuming the transmit time point of the SRS resource for positioning being transmitted from UE 106 is to, then the arrival time points of SRS for positioning received at the TRP0, TRP1, TRP2, and TRP3 are t0+T0, t0+T1, t0+T2 and t0+T3, respectively. In some embodiments, as shown in process 4 of FIG. 2, a respective TRP measures the UL RTOA, and then reports it to LMF 102 (e.g., FIG. 2). LMF 102 then calculates the relative time of arrival by using a TRP as the reference. As shown in FIG. 3, assuming TRP0 is used as the reference, the relative time of arrival associated with TRP1, TRP2 and TRP3, respectively, are:

$$\text{Delta1}=T1-T0=(d1-d0)/c$$

$$\text{Delta2}=T2-T0=(d2-d0)/c$$

$$\text{Delta3}=T3-T0=(d3-d0)/c$$

where c is the light speed. In some embodiments, LMF 102 may then calculate the location of UE 106 based on the values of Delta1, Delta2 and Delta3 and also the locations of TRP0, TRP1, TRP2 and TRP3.

In some embodiments, the UL TDOA positioning method discussed above with reference to FIG. 3 may assume that UE 106 applies the same transmit timing on all the SRS resources for positioning, so that LMF 102 can calculate the UL reference signal time difference of different TRPs. However, in some embodiments in real deployment, UE 106 may use different hardware. For example, UE 106 may use different transmit antenna panels and/or transmit chains to transmit different SRS resources for positioning. In some embodiments, different transmit antenna panels and/or transmit chains may have different Tx timing offsets. As a result, the time differences may introduce extra errors in the UL reference signal time difference of different TRPs and thus impair the positioning performance.

For example, as shown in FIG. 3, assume the SRS resources received by TRP0 and TRP2 are transmitted from one UE antenna panel, which has a Tx timing offset Δ0, and the SRS resources received by TRP1 and TRP2 are transmitted from another UE antenna panel that has a Tx timing offset M. If LMF 102 uses TRP0 as a reference to calculate the relative time of arrival of TRP1, TRP 2 and TRP 3, the results are:

$$\text{Delta1}=(T1+\Delta0)-(T0+\Delta0)=(d1-d0)/c$$

$$\text{Delta2}=(T2+\Delta1)-(T0+\Delta0)=(d2-d0)/c+(\Delta1-\Delta0)$$

$$\text{Delta3}=(T3+\Delta1)-(T0+\Delta0)=(d3-d0)/c+(\Delta1-\Delta0)$$

where an extra error of different timing offsets (Δ1–Δ0) may be introduced in Delta2 and Delta3. As a result, the location of UE 106 calculated based on Delta1, Delta2 and Delta3 may contain an error if such different timing offsets are not taken into consideration. Accordingly, there is a desire to reduce the error and improve the accuracy of positioning of the UE, e.g., when using the UL TDOA positioning method.

FIG. 4A is a flowchart illustrating an example method 400 for providing positioning of a UE, in accordance with embodiments of the present disclosure. In some embodiments, method 400 may be performed by a UE, such as UE 106 shown in FIGS. 1-3.

In step 402, the UE, e.g., UE 106, may receive configuration information for transmission of SRS resources for positioning. In some embodiments, the configuration information may be sent from LMF 102 implemented on a location server. In some embodiments, LMF 102 is configured to manage the resources and timing of positioning activities for determining locations of the UE. In some embodiments, the configuration information may be used by the UE to associate the SRS resources with a parameter, such as a higher layer parameter. In some embodiments, the higher layer parameter includes a Radio Resource Control (RRC) parameter. In some embodiments, the higher layer parameter has a plurality of values respectively corresponding to a plurality of transmit (Tx) timing offsets of the UE.

In step 404, according to the configuration information, the UE transmits the SRS resources for positioning associated with the higher layer parameter to a plurality of transmission/reception points (TRPs), wherein the plurality of values of the higher layer parameters are used for calculating, by the plurality of TRPs, positioning measurements between the UE and the plurality of TRPs based on the plurality of Tx timing offsets of the UE. For example, a particular TRP may calculate positioning measurements between the UE and the particular TRP based on the Tx timing offset of the UE associated with transmission of the SRS resources from the UE to the TRP. Such Tx timing offset may be obtained by the value of the higher layer parameter of the SRS resources received by the particular TRP. In some embodiments, LMF 102 at the location server may determine the position of the UE based on the calculated positioning measurements from the plurality of TRPs, considering the different Tx timing offsets of the UE.

For example, consistent with the discussion above with reference to FIG. 3, SRS resources received by TRP0 and TRP2 are transmitted from a first UE antenna panel or a first UE Tx chain having a first Tx timing offset Δ0, and the SRS resources received by TRP1 and TRP2 are transmitted from a second UE antenna panel or a second UE Tx chain having a second Tx timing offset M. LMF 102 at the location server may retrieve the Tx timing offset information based on the values of the higher layer parameter, and adjust the calculation of the relative time of arrival of TRP1, TRP2 and TRP3 to take into consideration the error of different timing offsets (Δ1–Δ0). As a result, the accuracy of the positioning of the UE can be improved.

In some embodiments, a UE, e.g., UE 106, may be configured with K≥1 sets of SRS resources for positioning. In each set, the UE may be configured with N≥1 SRS resources for positioning. In some embodiments, the SRS resource for positioning may be associated with a higher layer parameter, e.g., X1. In some embodiments, the value of X1 may correspond to a different Tx timing offset of the UE side. For example, UE 106 may have two different transmit antenna panels. In some embodiments, the higher layer parameter X1 may take the value of 0 or 1. In some embodiments, the value of X1 being 0 may correspond to a first UE antenna panel, and the value of X1 being 1 may correspond to a second UE antenna panel different from the first UE antenna panel. In some embodiments, the SRS resources associated with the same value of X1 are transmitted by the same hardware and with the same Tx timing offset.

In some embodiments, each SRS resource for positioning is associated with one value of the higher layer parameter X1. In some embodiments, each set of SRS resources for positioning is associated with one value of the higher layer parameter X1. In some embodiments, within one set, every SRS resource for positioning may be associated with the same value of the higher layer parameter X1.

In some embodiments, the value of the higher layer parameter X1 may be associated with an SRS resource for positioning through one or more methods. In some embodiments, a respective SRS resource for positioning is associated with a value of the higher layer parameter X1. In some embodiments, in the configuration of one SRS resource, a higher layer parameter X1 may be included in the parameter defined as SRS resource in NR Positioning Protocol A (NRPPa) protocol. In some embodiments, a higher layer parameter X1 may be included in the parameter defined as SRS-PosResource in Radio Resource Control (RRC) protocol.

In some embodiments, a respective SRS resource set of SRS resources for positioning is associated with a value of the higher layer parameter X1. In some embodiments, in the configuration of one SRS resource set, the higher layer parameter X1 may be included in the information element SRS resource set in the NRPPa protocol. In some embodiments, the higher layer parameter X1 may be included in the RRC parameter SRS-PosResourceSet. In some embodiments, for a semi-persistent SRS resource for positioning, the activation MAC CE may indicate one value of X1 for the activated SRS resource. In some embodiments, for an aperiodic SRS resource for positioning, triggering Downlink Control Information (DCI) may indicate one value of X1 for the triggered SRS resources.

In some embodiments, a UE, e.g., UE 106, may report a UE capability for the higher layer parameter X1. In some embodiments, the reported UE capability may be associated with the maximum number of values supported for the higher layer parameter X1. In some embodiments, the number of values of X1 may correspond to the number of different antenna panels or the number of transmit chains that have different Tx timing offset.

In some embodiments, the UE capability may be per-band. The benefit of having the UE capability per-band is that it can support the full flexibility of UE implementation. In some embodiments, the UE capability may be a per-band combination. The benefit of having the UE capability per-band combination is that it can support the full flexibility of UE implementation. In some embodiments, the UE capability may be for Frequency Range 2 (FR2), e.g., from 24.25 GHz to 52.6 GHz. This may be the UE capability specification design.

FIG. 4B is a flowchart illustrating an example method 450 for providing positioning of a UE, e.g., UE 106, in accordance with embodiments of the present disclosure. In some embodiments, method 450 may be performed by a TRP, such as anyone of TRP 104-1 to TRP 104-4, or TRP0 to TRP3, shown in FIGS. 1-3.

In step 452, a TRP, e.g., any one of TRP 104-1 to TRP 104-4, or TRP0 to TRP3, may receive SRS resources for positioning associated with a higher layer parameter from the UE, e.g., UE 106. In some embodiments, the higher layer parameter has a value corresponding to a transmit (Tx) timing offset of the UE associated with transmission of the SRS resources.

In step 454, the TRP calculates a positioning measurement between the UE and the TRP based on the SRS resources and according to the Tx timing offset of the UE. In step 456, the TRP reports the calculated positioning measurement associated with the Tx timing offset to a location server for determining the position of the UE. For example, as discussed above with reference to FIG. 3, SRS resources received by TRP0 and TRP2 are transmitted from a first UE antenna panel or a first UE Tx chain having a first Tx timing offset Δ0, and the SRS resources received by TRP1 and TRP2 are transmitted from a second UE antenna panel or a second UE Tx chain having a second Tx timing offset M. The location server may retrieve the Tx timing offset information based on a correspondence relationship between Tx timing offset information and the values of the higher layer parameter, and adjust the calculation of the relative time of arrival of TRP1, TRP2 and TRP3 to take into consideration the error of different timing offsets (Δ1–Δ0). As a result, the accuracy of the positioning of the UE can be improved.

In some embodiments, a TRP, e.g., any one of TRP 104-1 to TRP 104-4, or TRP0 to TRP3, may report a UL RTOA measurement that is measured and determined based on an SRS resource associated with one Tx timing offset. In some embodiments, the TRP may report the information of the Tx timing offset applied on the SRS resource transmission that is used to calculate one UL RTOA measurement.

In some embodiments, at the TRP side, the TRP may also have an Rx timing delay in the Rx chain. In some embodiments, the TRP may have multiple Rx chains or Rx antenna panels. As a result, the TRP may have multiple different Rx timing delays. The TRP may report the information of Rx timing delay for one UL RTOA measurement.

In some embodiments, the TRP may report one UL RTOA measurement. In some embodiments, the TRP may also report a first index that indicates the Tx timing associated with the SRS resource that the reported UL RTOA measurement is measured from.

In some embodiments, for each reported UL RTOA measurement, the TRP may report a first index to indicate the associated Tx timing delay at the UE side. UL RTOA measurements with different values of the first index may be measured from SRS resources that are transmitted with different Tx timing delays.

In some embodiments, for each reported UL RTOA measurement, the TRP may report the SRS resource ID of the SRS resource that is used to obtain the reported UL RTOA measurement. The LMF, e.g., LMF 102, may derive the associated UE Tx timing delay according to the reported SRS resource ID.

In some embodiments, for each reported UL RTOA measurement, the TRP may report an SRS resource set ID of the SRS resource(s) that is used to obtain the reported UL RTOA measurement. The LMF may derive the associated UE Tx timing delay according to the reported SRS resource ID.

In some embodiments, for each reported UL RTOA measurement, the TRP may report a second index to indicate the associated TRP side Rx timing delay. UL RTOA measurements with different values of the second index may be measured from an SRS resource received from different chains or antenna panels with different Rx timing delays.

In some embodiments, for each reported UL RTOA measurement, the TRP may report a third index to indicate the associated UE side Tx timing delay and TRP side Rx timing delay. UL RTOA measurements with different values of the third index may be measured from an SRS resource received from different TRP chains or antenna panels with different Rx timing delays, and/or transmitted from UE chains/antenna panels with different Tx timing delays. In some embodiments, two UL RTOA measurements with the same value of the third index may be associated with the same UE side Tx timing delay and same TRP side Rx timing delay.

In some embodiments, the information element (IE) of a UL RTOA measurement in an NRPPa message may include a new parameter to indicate the first index, the second index, or the third index. For example, as shown in the Table 1 below, in some embodiments, a value (such as an integer value) of a parameter defined as TimingDelayGroupIndication may be used to indicate the first index. In some embodiments, the value of the parameter TimingDelayGroupIndication may be 0 or 1. In some embodiments, the value of the parameter may be 0, 1, or 2. In some embodiments, the value of the parameter may be 0, 1, 2, or 3. In some embodiments, the IEs are marked mandatory (M) as always be included in the message; optional (O) as may or may not be included in the message; or conditional (C) as shall be included in a message only if the condition is satisfied, or else the IE shall not be included.

TABLE 1

| IE/Group Name | Presence | Range | IE Type and Reference | Semantics Description |
|---|---|---|---|---|
| CHOICE UL RTOA Measurement | M | | | |
| >k0 | M | | INTEGER (0.. 1970049) | TS 38.133 [16] |

TABLE 1-continued

| IE/Group Name | Presence | Range | IE Type and Reference | Semantics Description |
|---|---|---|---|---|
| >k1 | M | | INTEGER (0.. 985025) | TS 38.133 [16] |
| >k2 | M | | INTEGER (0.. 492513) | TS 38.133 [16] |
| >k3 | M | | INTEGER (0.. 246257) | TS 38.133 [16] |
| >k4 | M | | INTEGER (0.. 123129) | TS 38.133 [16] |
| >k5 | M | | INTEGER (0.. 61565) | TS 38.133 [16] |
| TimingDelayGroupIndication | O | | INTEGER (0.. 1) | |
| Additional Path List | O | | 9.2.41 | |

In some embodiments, as shown in Table 2 below, a value (such as an integer value) of the parameter TxTimingDelayGroupIndication is used to indicate the first index and another parameter, defined as RxTimingDelayGroupIndication, is used to indicate the second index. In some embodiments, the value of TxTimingDelayGroupIndication may be one value selected from {0,1}, {0,1,2}, or {0,1,2,3}. In some embodiments, the value of RxTimingDelayGroupIndication may be one value selected from {0,1} or {0,1,2} or {0,1,2, 3}.

TABLE 2

| IE/Group Name | Presence | Range | IE Type and Reference | Semantics Description |
|---|---|---|---|---|
| CHOICE UL RTOA Measurement | M | | | |
| >k0 | M | | INTEGER (0.. 1970049) | TS 38.133 [16] |
| >k1 | M | | INTEGER (0.. 985025) | TS 38.133 [16] |
| >k2 | M | | INTEGER (0.. 492513) | TS 38.133 [16] |
| >k3 | M | | INTEGER (0.. 246257) | TS 38.133 [16] |
| >k4 | M | | INTEGER (0.. 123129) | TS 38.133 [16] |
| >k5 | M | | INTEGER (0.. 61565) | TS 38.133 [16] |
| TxTimingDelayGroupIndication | O | | INTEGER (0.. 1) | |
| RxTimingDelayGroupIndication | O | | INTEGER (0.. 1) | |
| Additional Path List | O | | 9.2.41 | |

In some embodiments, the information element of the measurement result in an NRPPa message may include a new parameter to indicate the first index, or the second index, or the third index. For example, as shown in Table 3 below, a value (such as an integer value) the parameter TimingDelayGroupIndication may be used to indicate the first index. In some embodiments, the value of the parameter TimingDelayGroupIndication may be 0 or 1. In some embodiments, the value of the parameter may be 0, 1 or 2. In some embodiments, the value of the parameter may be 0, 1, 2, or 3.

TABLE 3

| IE/Group Name | Presence | Range | IE Type and Reference | Semantics Description |
|---|---|---|---|---|
| Measured Result Item | | 1 .. <maxnoPosMeas> | | |
| >CHOICE Measured Results Value | M | | | |

TABLE 3-continued

| IE/Group Name | Presence | Range | IE Type and Reference | Semantics Description |
|---|---|---|---|---|
| >>UL Angle of Arrival | M | | 9.2.38 | |
| >>UL SRS-RSRP | M | | INTEGER (0.. 127) | |
| >>UL RTOA | M | | 9.2.39 | |
| >>gNB Rx-Tx Time Difference | M | | 9.2.40 | |
| >Time Stamp | M | | 9.2.42 | |
| >Measurement Quality | O | | 9.2.43 | |
| >Measurement Beam Information | O | | 9.2.57 | |
| >TimingDelayGroupIndic ation | O | | INTEGER (0.. 1) | |

In some embodiments, as shown in Table 4 below, a value of (e.g., an integer value) the parameter TxTimingDelay-GroupIndication is used to indicate the first index and the RxTimingDelayGroupIndication is used to indicate the second index. In some embodiments, the value of TxTimingDe-layGroupIndication may be one value selected from {0, 1} or {0, 1, 2} or {0, 1, 2, 3}. In some embodiments, the value of RxTimingDelayGroupIndication may be one value selected from {0, 1} or {0, 1, 2} or {0, 1, 2, 3}.

TABLE 4

| IE/Group Name | Presence | Range | IE Type and Reference | Semantics Description |
|---|---|---|---|---|
| Measured Result Item | | 1 .. <maxnoPosMeas | | |
| >CHOICE Measured Results Value | M | | | |
| >>UL Angle of Arrival | M | | 9.2.38 | |
| >>UL SRS-RSRP | M | | INTEGER (0.. 127) | |
| >>UL RTOA | M | | 9.2.39 | |
| >>gNB Rx-Tx Time Difference | M | | 9.2.40 | |
| >Time Stamp | M | | 9.2.42 | |
| >Measurement Quality | 0 | | 9.2.43 | |
| >Measurement Beam Information | O | | 9.2.57 | |
| >TxTimingDelayGroupIn dication | O | | INTEGER(0.. 1) | |
| >RxTimingDelayGroupIn dication | O | | INTEGER(0.. 1) | |

Figure 5:
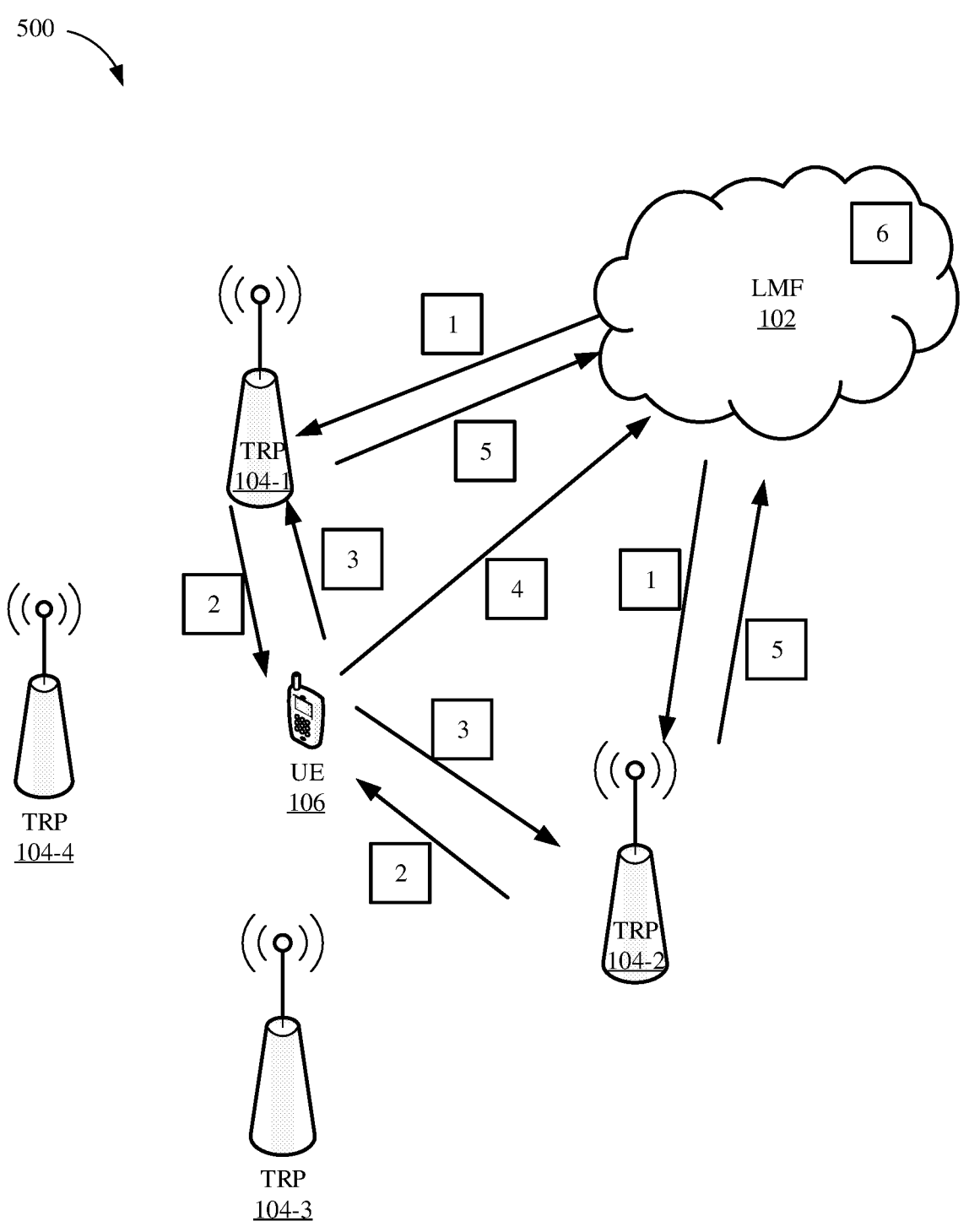
FIG. 5 is a schematic diagram illustrating an example of an NR positioning procedure based on downlink and uplink measurement, in accordance with embodiments of the present disclosure.

FIG. 5 is a schematic diagram illustrating an example of a New Radio (NR) positioning procedure 500 based on downlink and uplink measurement, in accordance with embodiments of the present disclosure. In some embodiments, New Radio (NR) positioning procedure 500 is regarded as a Multiple Roundtrip Time (multi-RTT) method. In some embodiments, NR positioning procedure 500 also involves LMF 102, the plurality of TPRs 104-1, 104-2, 104-3, . . . , and UE 106 that are in wireless communication as shown in FIG. 5.

In some embodiments, NR positioning procedure 500 starts from process 1 where LMF 102 and TRPs 104 (e.g., TRP 104-1, 104-2 . . . ) coordinate the configuration of SRS for positioning and DL PRS resources. In process 2, the serving cell, e.g., TRP 104-1 or 104-2 in FIG. 5, provides the configuration of SRS for positioning to UE 106. In some embodiments, TRPs 104 also transmit DL PRS resources to UE 106. In process 3, UE 106 transmits, to respective TRPs 104, such as TRP 104-1, 104-2, and/or other TRPs, the SRS for positioning according to the configuration. In process 4, UE 106 measures Rx-Tx time difference and reports the measurements of Rx-Tx timing differences to LMF 102. In process 5, a respective TRP, such as TRP 104-1 or 104-2, measures the gNB Rx-Tx time difference and reports the measurements of gNB Rx-Tx timing difference to LMF 102. In process 6, LMF 102 then calculates the location of UE 106 based on the reported positioning measurement results of the UE Rx-Tx time difference and the gNB Rx-Tx timing difference.

Figure 6:
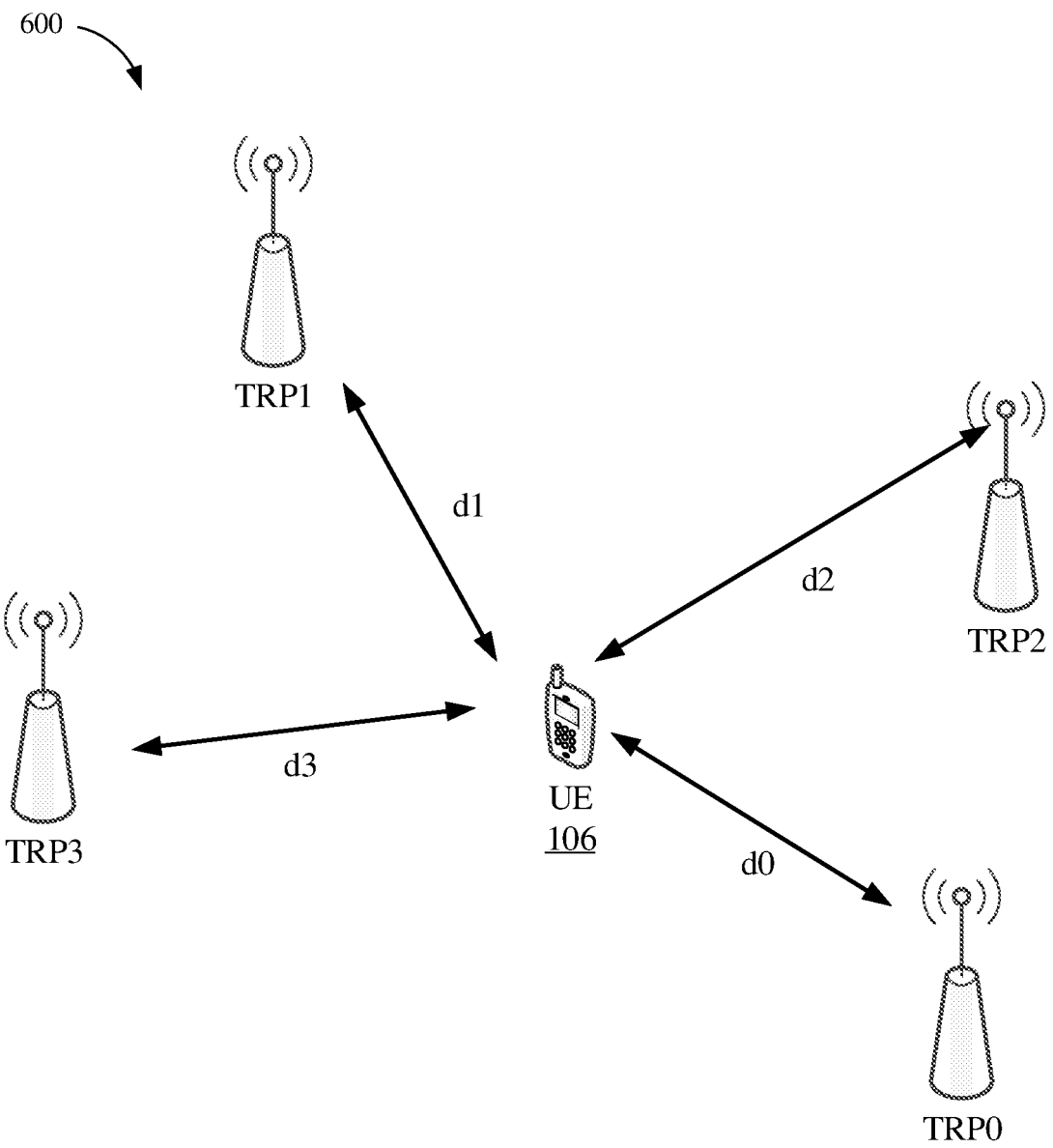
FIG. 6 is a schematic diagram illustrating an example of an NR multi-RTT positioning method, in accordance with embodiments of the present disclosure.

FIG. 6 is a schematic diagram illustrating an example of NR multi-RTT positioning procedure 600, in accordance with embodiments of the present disclosure. In some embodiments as shown in FIG. 6, four TRPs, such as TRP0, TRP1, TRP2, and TRP3, (e.g., TRP 104-1, TRP 104-2, TRP 104-3, TRP 104-4 of FIG. 5), are used to determine the location of one UE, e.g., UE 106. In some embodiments, UE 106 measures the UE Rx-Tx time difference with respect to the respective TRPs, e.g., TRP0-TRP3, and the UE Rx-Tx time differences can be denoted as: $Rx/Tx_0^{UE}$, $Rx/Tx_1^{UE}$, $Rx/Tx_2^{UE}$ and $Rx/Tx_3^{UE}$, respectively. In some embodiments, each respective TRP measures the gNB Rx-Tx time difference of UE 106, and the gNB Rx-Tx time differences can be denoted as $Rx/Tx_0^{gNB}$, $Rx/Tx_1^{gNB}$, $Rx/Tx_0^{gNB}$ and $Rx/Tx_0^{gNB}$, respectively. In some embodiments as shown in FIG. 6, the distances between UE 106 and TRP0, TRP1, TRP2, and TRP3 are d0, d1, d2 and d3, respectively. With all the reported UE Rx-Tx time difference measurements (e.g., process 4 of FIG. 5) and the reported gNB Rx-Tx time difference measurements (e.g., process 5 of FIG. 5), LMF 102 calculates the distance between UE 106 and the respective TRPs 104, e.g., TRP0, TRP1, TRP2, and TRP3, as:

$$d0 = (Rx/Tx_0^{gNB} + Rx/Tx_0^{UE})/(2 \times c)$$

$$d1 = (Rx/Tx_1^{gNB} + Rx/Tx_1^{UE})/(2 \times c)$$

$$d2 = (Rx/Tx_2^{gNB} + Rx/Tx_2^{UE})/(2 \times c)$$

$$d3 = (Rx/Tx_3^{gNB} + Rx/Tx_3^{UE})/(2 \times c)$$

where c is the light speed. In some embodiments, LMF 102 then calculates the location of UE 106 based on the calculated distances between UE 106 and TRPs 104.

In some embodiments, the NR multi-RTT positioning procedure 600 described above with reference to FIG. 6 may assume that there does not exist an Rx timing delay and a Tx timing delay at the side of UE 106 when UE 106 measures the UE Rx-Tx time difference. However, in some embodiments in real deployment, UE 106 may use different hardware. For example, UE 106 may use different transmit antenna panels to transmit different SRS resources for positioning and receive DL PRS resources. Different antenna panels may have different Tx timing delay and/or Rx timing delay. In some embodiments, the Tx timing delay in SRS transmission and/or Rx timing delay in receiving a DL PRS resource may introduce errors in a UE Rx-Tx time difference measurement and/or a gNB Rx-Tx time difference measurement. As a result, the performance of multi-RTT positioning method may be impaired. In some embodiments, as shown in FIG. 6, assumed that the SRS transmission has a Tx timing delay $\Delta_{Tx}$ and the reception of DL PRS resource has a Rx timing delay $\Delta_{Rx}$. Then the estimated distances between UE 106 and the respective TRPs 104, e.g., TRP0, TRP1, TRP2, and TRP3, are:

$$\text{Estimated } d0 = d0(\Delta_{Tx} + \Delta_{Rx})/(2 \times c)$$

$$\text{Estimated } d1 = d1(\Delta_{Tx} + \Delta_{Rx})/(2 \times c)$$

$$\text{Estimated } d2 = d2(\Delta_{Tx} + \Delta_{Rx})/(2 \times c)$$

$$\text{Estimated } d3 = d3(\Delta_{Tx} + \Delta_{Rx})/(2 \times c)$$

In some embodiments, LMF 102 calculates the location of UE 106 based on the estimated d0~d3. The Tx and Rx timing delay at the UE side may introduce positioning errors in the multi-RTT positioning solution. Accordingly, a solution, e.g., as discussed with reference to FIG. 7 below, to reduce the negative impact of Rx and Tx timing delay of UE 106 on the performance of multi-RTT positioning method is desired.

FIG. 7 is a flowchart illustrating an example method 700 for providing positioning of a UE, in accordance with embodiments of the present disclosure. In some embodiments, method 700 may be performed by a UE, such as UE 106 shown in FIGS. 1-3, 5, and 6.

In step 702, the UE receives DL PRS resources, and in step 704, in response to receiving the DL PRS resources, the UE transmits SRS resources for positioning to a plurality of transmission/reception points (TRPs), such as TRP 104-1-TRP 104-4, or TRP0-TRP3.

In step 706, the UE determines a plurality of receive (Rx)-transmit (Tx) timing difference measurement results based on the receipt of the DL PRS resources and the transmission of the SRS resources. In some embodiments, the plurality of Rx-Tx timing difference measurements correspond to a plurality of Tx timing offsets or a plurality of Rx timing offsets of the UE In step 708, the UE transmits the plurality of Rx-Tx timing difference measurement results and a plurality of indication information items associated with the Rx-Tx timing difference measurement results respectively to LMP 102 implemented at a location server. In some embodiments, the plurality of indication information items correspond to the plurality of Tx timing offsets and/or the plurality of Rx timing offsets of the UE.

In some embodiments, the location server may determine the position of the UE based on the plurality of Rx-Tx timing difference measurement results and the plurality of Tx timing offsets and/or the plurality of Rx timing offsets of the UE. For example, as discussed above with reference to FIG. 6, if an SRS transmission has a Tx timing offset $\Delta_{Tx}$, and a reception of DL PRS resource has an Rx timing offset $\Delta_{Rx}$, the estimated distances between UE 106 and respective TRPs 104, e.g., TRP0, TRP1, TRP2, and TRP3, may consider an additional factor $(\Delta_{Tx} + \Delta_{Rx})/(2 \times c)$. The location server may adjust the calculation of the distances between UE 106 and TRP0, TRP1, TRP2 and TRP3 to take into consideration the error of the Tx and/or Rx timing offsets $(\Delta_{Tx} \pm \Delta_{Rx})$. As a result, the accuracy of the positioning of the UE can be improved.

In some embodiments, a UE, e.g., UE 106, may report UE Rx-Tx time difference measurement results to the network. In some embodiments, for a respective reported UE Rx-Tx time difference measurement, the UE may report first indication information. In some embodiments, a particular first indication information may be associated with and indicative of a particular UE hardware and the same Rx timing delay. For example, the plurality of UE Rx-Tx time difference measurements associated with the same indication information in one measurement report may be measured from the same UE hardware, such as the same UE Rx chain or UE antenna panel(s), and include the same Rx timing delay.

In some embodiments, for a respective reported UE Rx-Tx time difference measurement, the UE may report second indication information. In some embodiments, a particular second indication information may be associated with and indicative of a particular UE hardware and the same Tx timing delay. For example, the plurality of UE Rx-Tx time difference measurements associated with the same indication information in one measurement report are measured from the same UE Tx chain or UE antenna panel(s) and include the same Tx timing delay.

In some embodiments, for a respective reported UE Rx-Tx time difference measurement, the UE may report third indication information. In some embodiments, a particular third indication information may be associated with and indicative of a particular UE hardware and the same Tx and Rx timing delays. For example, the plurality of UE Rx-Tx time difference measurements associated with the same indication information in one measurement report are measured from the same UE Tx and Rx chains or UE antenna panel(s) and include the same Tx and Rx timing delays.

In some embodiments, the UE may report $M \geq 2$ (M being an integer) sets of UE Rx-Tx time difference measurement results. In some embodiments, all the UE Rx-Tx time difference measurement results contained in the same set are measured with the same UE Rx chain. In some embodiments, all the UE Rx-Tx time difference measurement results contained in the same set are measured with the same UE Tx chain. In some embodiments, all the UE Rx-Tx time difference measurement results contained in the same set are measured with the same UE Rx chain and same UE Tx chain.

In some embodiments, different sets of UE Rx-Tx time difference measurement results may correspond to different UE Rx timing delays. In some embodiments, different sets of UE Rx-Tx time difference measurement results may correspond to different UE Tx timing delays. In some embodiments, different sets of UE Rx-Tx time difference measurement results may correspond to different UE Rx timing delays and/or different UE Tx timing delays.

In some embodiments, the UE may report M≥2 sets of UE Rx-Tx time difference measurement results to the location server through an LTE Positioning Protocol (LPP) message. In some embodiments, the UE may report M≥2 sets of UE Rx-Tx time difference measurement results to the gNB through a radio resource control (RRC) message. In some embodiments, the value of M may be 2, 3, 4, 5, 6, 7, 8, or other suitable integer.

In some embodiments, the UE may report M≥2 sets of UE Rx-Tx time difference measurement results to the location server in a message body, e.g., defined as ProvideLocationInformation, in an LPP message. The UE may report M sets of UE Rx-Tx time difference measurement results through the information element (IE) of message body NR-Multi-RTT-ProvideLocationInformation. In some embodiments, two fields in the ProvideLocationInformation message body is used to report M sets of UE Rx-Tx time difference measurement results. For example, a part of a message including ProvideLocationInformation message body is shown below:

```
ProvideLocationInformation-r9-IEs ::= SEQUENCE {
commonIEsProvideLocationInformation
CommonIEsProvideLocationInformation   OPTIONAL,
a-gnss-ProvideLocationInformation A-GNSS-
ProvideLocationInformation OPTIONAL,
otdoa-ProvideLocationInformation   OTDOA-
ProvideLocationInformation OPTIONAL,
ecid-ProvideLocationInformation        ECID-
ProvideLocationInformation        OPTIONAL,
epdu-ProvideLocationInformation       EPDU-Sequence
OPTIONAL,
...,
[[
sensor-ProvideLocationInformation-r13
                Sensor-
ProvideLocationInformation-r13
                OPTIONAL,
tbs-ProvideLocationInformation-r13 TBS-
ProvideLocationInformation-r13   OPTIONAL,
wlan-ProvideLocationInformation-r13   WLAN-
ProvideLocationInformation-r13   OPTIONAL,
bt-ProvideLocationInformation-r13 BT-
ProvideLocationInformation-r13   OPTIONAL
]],
[[ nr-ECID-ProvideLocationInformation-r16
                NR-ECID-ProvideLocationInformation-
r16        OPTIONAL,
    nr-Multi-RTT-ProvideLocationInformation-r16
                NR-Multi-RTT-
ProvideLocationInformation-r16 OPTIONAL,
    nr-DL-AoD-ProvideLocationInformation-r16
                NR-DL-AoD-
ProvideLocationInformation-r16   OPTIONAL,
    nr-DL-TDOA-ProvideLocationInformation-r16
                NR-DL-TDOA-
ProvideLocationInformation-r16   OPTIONAL
]]
nr-Multi-RTT-ProvideLocationInformationList
                SEQUENCE (SIZE(1...MaxNum))NR-Multi-
RTT-ProvideLocationInformation-r16 OPTIONAL,
}
```

In some embodiments, an nr-Multi-RTT-ProvideLocationInformationList is a field defined in the message body, which is a sequence of information elements (IEs) NR-Multi-RTT-ProvideLocationInformation-r16. In some embodiments, the field of nr-Multi-RTT-ProvideLocationInformation-r16 is used to report one set of the M sets of UE Rx-Tx time difference measurement results and the field of nr-Multi-RTT-ProvideLocationInformationList is used to report the remaining M−1 of those M sets of UE Rx-Tx time difference measurement results.

In some embodiments, one field in ProvideLocationInformation is used to report M sets of UE Rx-Tx time difference measurement results. For example, a message design is shown below:

```
ProvideLocationInformation-r9-IEs ::= SEQUENCE {
commonIEsProvideLocationInformation
CommonIEsProvideLocationInformation   OPTIONAL,
a-gnss-ProvideLocationInformation A-GNSS-
ProvideLocationInformation OPTIONAL,
otdoa-ProvideLocationInformation   OTDOA-
ProvideLocationInformation OPTIONAL,
ecid-ProvideLocationInformation        ECID-
ProvideLocationInformation        OPTIONAL,
epdu-ProvideLocationInformation       EPDU-Sequence
OPTIONAL,
...,
[[
sensor-ProvideLocationInformation-r13
                Sensor-
ProvideLocationInformation-r13
                OPTIONAL,
tbs-ProvideLocationInformation-r13 TBS-
ProvideLocationInformation-r13   OPTIONAL,
wlan-ProvideLocationInformation-r13   WLAN-
ProvideLocationInformation-r13   OPTIONAL,
bt-ProvideLocationInformation-r13 BT-
ProvideLocationInformation-r13   OPTIONAL
]],
[[ nr-ECID-ProvideLocationInformation-r16
                NR-ECID-ProvideLocationInformation-
r16        OPTIONAL,
nr-Multi-RTT-ProvideLocationInformation-r16
                NR-Multi-RTT-
ProvideLocationInformation-r16 OPTIONAL,
    nr-DL-AoD-ProvideLocationInformation-r16
                NR-DL-AoD-
ProvideLocationInformation-r16   OPTIONAL,
    nr-DL-TDOA-ProvideLocationInformation-r16
                NR-DL-TDOA-
ProvideLocationInformation-r16   OPTIONAL
]]
nr-Multi-RTT-ProvideLocationInformationList
                SEQUENCE (SIZE (1...MaxNum)) NR-Multi-
RTT-ProvideLocationInformation-r16 OPTIONAL,
}
```

In some embodiments, the nr-Multi-RTT-ProvideLocationInformationList is defined herein, which is a sequence of information elements NR-Multi-RTT-ProvideLocationInformation-r16. In some embodiments, if the UE reports one set of UE Rx-Tx time difference measurement results, the UE may report the field of nr-Multi-RTT-ProvideLocationInformation-r16. In some embodiments, if the UE reports M>1 sets of UE Rx-Tx time difference measurement results, the UE may use the field of nr-Multi-RTT-ProvideLocationInformationList to report those M sets of UE Rx-Tx time difference measurement results.

In some embodiments, M fields in ProvideLocationInformation are used to report M sets of UE Rx-Tx time difference measurement results. For example, a message design is shown below:

```
ProvideLocationInformation-r9-IEs ::= SEQUENCE {
commonIEsProvideLocationInformation
CommonIEsProvideLocationInformation   OPTIONAL,
a-gnss-ProvideLocationInformation A-GNSS-
ProvideLocationInformation OPTIONAL,
otdoa-ProvideLocationInformation   OTDOA-
ProvideLocationInformation OPTIONAL,
ecid-ProvideLocationInformation   ECID-
ProvideLocationInformation       OPTIONAL,
epdu-ProvideLocationInformation       EPDU-Sequence
OPTIONAL,
...,
[[
sensor-ProvideLocationInformation-r13
               Sensor-
ProvideLocationInformation-r13
                    OPTIONAL,
tbs-ProvideLocationInformation-r13 TBS-
ProvideLocationInformation-r13   OPTIONAL,
wlan-ProvideLocationInformation-r13   WLAN-
ProvideLocationInformation-r13   OPTIONAL,
bt-ProvideLocationInformation-r13 BT-
ProvideLocationInformation-r13   OPTIONAL
]],
[[ nr-ECID-ProvideLocationInformation-r16
               NR-ECID-ProvideLocationInformation-
r16       OPTIONAL,
   nr-Multi-RTT-ProvideLocationInformation-r16
               NR-Multi-RTT-
ProvideLocationInformation-r16 OPTIONAL,
   nr-DL-AoD-ProvideLocationInformation-r16
               NR-DL-AoD-
ProvideLocationInformation-r16   OPTIONAL,
   nr-DL-TDOA-ProvideLocationInformation-r16
               NR-DL-TDOA-
ProvideLocationInformation-r16   OPTIONAL
]]
nr-Multi-RTT-ProvideLocationInformation2nd
               NR-Multi-RTT-
ProvideLocationInformation-r16 OPTIONAL,
}
```

In some embodiments, the nr-Multi-RTT-ProvideLocationInformation2nd is a field defined herein, which is one information element NR-Multi-RTT-Provide-LocationInformation-r16. In some embodiments, if the UE reports one set of UE Rx-Tx time difference measurement results, the UE reports the field of nr-Multi-RTT-Provide-LocationInformation-r16. In some embodiments, if the UE reports M=2 sets of UE Rx-Tx time difference measurement results, the UE uses the field of nr-Multi-RTT-ProvideLo-cationInformation-r16 to report one set of UE Rx-Tx time difference measurement results and then uses the field of nr-Multi-RTT-ProvideLocationInformation2nd to report the other set of UE Rx-Tx time difference measurement results.

In some embodiments, a UE can report M≥2 (M is an integer) sets of UE Rx-Tx time difference measurement results to the location server, e.g., LMF 102, in the IE NR-Multi-RTT-ProvideLocationInformation, where multiple information elements (IEs) of NR-Multi-RTT-Provide-LocationInformation may be used to report the M sets of UE Rx-Tx time difference measurement results.

In some embodiments, two fields in NR-Multi-RTT-ProvideLocationInformation are used to report M sets of UE Rx-Tx time difference measurement results. For example, a message design is shown below:

```
NR-Multi-RTT-ProvideLocationInformation-r16 ::= SEQUENCE {
nr-Multi-RTT-SignalMeasurementInformation-r16
       NR-Multi-RTT-
SignalMeasurementInformation-r16
OPTIONAL,
nr-Multi-RTT-Error-r16 NR-Multi-RTT-Error-r16
OPTIONAL,
nr-Multi-RTT-SignalMeasurementInformationList
       SEQUENCE (SIZE (1..MaxNum)) of
NR-Multi-RTT-SignalMeasurementInformation-r16
OPTIONAL,
...
}
```

In some embodiments, the nrMulti-RTT-SignalMeasurementInformationList is a field defined herein, which is a sequence of information elements (IEs) NR-Multi-RTT-SignalMeasurementInformation-r16. In some embodiments, the field of nr-Multi-RTT-SignalMeasurementInformation-r16 may be used to report one set of the M sets of UE Rx-Tx time difference measurement results, and the field of nr-Multi-RTT-SignalMeasurementInformationList may be used to report the remaining M−1 of the M sets of UE Rx-Tx time difference measurement results.

In some embodiments, one field in NR-Multi-RTT-ProvideLocationInformation is used to report M sets of UE Rx-Tx time difference measurement results. For example, a message design is shown below:

```
NR-Multi-RTT-ProvideLocationInformation-r16 ::= SEQUENCE {
nr-Multi-RTT-SignalMeasurementInformation-r16
       NR-Multi-RTT-
SignalMeasurementInformation-r16
OPTIONAL,
nr-Multi-RTT-Error-r16           NR-Multi-RTT-Error-r16
OPTIONAL,
nr-Multi-RTT-SignalMeasurementInformationList
       SEQUENCE (SIZE (1..MaxNum)) of
NR-Multi-RTT-SignalMeasurementInformation-r16
OPTIONAL,
...
}
```

In some embodiments, the nrMulti-RTT-SignalMeasurementInformationList is a field defined herein, which is a sequence of information elements NR-Multi-RTT-Sig-nalMeasurementInformation-r16. In some embodiments, if the UE reports one set of UE Rx-Tx time difference measurement results, the UE may report the field of nr-Multi-RTT-SignalMeasurementInformation-r16. In some embodiments, if the UE reports M>1 sets of UE Rx-Tx time difference measurement results, the UE may use the field of nr-Multi-RTT-SignalMeasurementInformationList to report the M sets of UE Rx-Tx time difference measurement results.

In some embodiments, M fields in NR-Multi-RTT-Provi-deLocationInformation are used to report M sets of UE Rx-Tx time difference measurement results. For example, a message design is shown below:

```
NR-Multi-RTT-ProvideLocationInformation-r16 ::= SEQUENCE {
nr-Multi-RTT-SignalMeasurementInformation-r16
        NR-Multi-RTT-
SignalMeasurementInformation-r16
OPTIONAL,
nr-Multi-RTT-Error-r16          NR-Multi-RTT-Error-r16
OPTIONAL,
nr-Multi-RTT-SignalMeasurementInformation2nd
        NR-Multi-RTT-
SignalMeasurementInformation-r16
OPTIONAL,
...
}
```

In some embodiments, the nrMulti-RTT-SignalMeasurementInformation2nd is a field defined herein, which is one information element NR-Multi-RTT-SignalMeasurementInformation-r16. In some embodiments, if the UE reports one set of UE Rx-Tx time difference measurement results, the UE may report the field of nr-Multi-RTT-SignalMeasurementInformation-r16. In some embodiments, if the UE reports M=2 sets of UE Rx-Tx time difference measurement results, the UE may use the field of nr-Multi-RTT-SignalMeasurementInformation-r16 to report one set of UE Rx-Tx time difference measurement results and then use the field of nr-Multi-RTT-SignalMeasurementInformation2nd to report the other set of UE Rx-Tx time difference measurement results.

In some embodiments, a UE can report M≥2 sets of UE Rx-Tx time difference measurement results to the location server, e.g., LMF 102, in the IE NR-Multi-RTT-ProvideLocationInformation, where multiple IEs of NR-Multi-RTT-MeasList-r16 may be used to report these M sets of UE Rx-Tx time difference measurement results.

In some embodiments, two fields in NR-Multi-RTT-SignalMeasurementInformation may be used to report M sets of UE Rx-Tx time difference measurement results. For example, a message design is shown below:

```
NR-Multi-RTT-SignalMeasurementInformation-r16 ::= SEQUENCE
{
nr-Multi-RTT-MeasList-r16       NR-Multi-RTT-MeasList-r16,
nr-NTA-Offset-r16               ENUMERATED { nTA1, nTA2, nTA3,
nTA4, ... }       OPTIONAL,
nr-Multi-RTT-MeasList2nd       SEQUENCE (SIZE
(1..MaxNum)) NR-Multi-RTT-MeasList-r16 OPTIONAL
...
}
```

In some embodiments, the nr-Multi-RTT-MeasList2nd is a field defined herein, which is a sequence of information elements NR-Multi-RTT-MeasList-r16. In some embodiments, the field of nr-Multi-RTT-MeasList-r16 may be used to report one set of the M sets of UE Rx-Tx time difference measurement results, and the field of nr-Multi-RTT-MeasList2nd may be used to report the remaining M−1 of the M sets of UE Rx-Tx time difference measurement results.

In some embodiments, M fields in NR-Multi-RTT-SignalMeasurementInformation are used to report M sets of UE Rx-Tx time difference measurement results. For example, a message design with M=2 is shown below:

```
NR-Multi-RTT-SignalMeasurementInformation-r16 ::= SEQUENCE
{
nr-Multi-RTT-MeasList-r16       NR-Multi-RTT-MeasList-r16,
nr-NTA-Offset-r16               ENUMERATED { nTA1, nTA2, nTA3,
nTA4, ... }       OPTIONAL,
nr-Multi-RTT-MeasList2nd   NR-Multi-RTT-MeasList-r16
OPTIONAL
...
}
```

In some embodiments, the nr-Multi-RTT-MeasList2nd is a field defined herein, which is one information element NR-Multi-RTT-MeasList-r16. In some embodiments, if the UE reports one set of UE Rx-Tx time difference measurement results, the UE may report the field of nr-Multi-RTT-MeasList-r16. In some embodiments, if the UE reports M=2 sets of UE Rx-Tx time difference measurement results, the UE uses the field of nr-Multi-RTT-MeasList-r16 to report one set of UE Rx-Tx time difference measurement results, and then uses the field of nr-Multi-RTT-MeasList2nd to report the other set of UE Rx-Tx time difference measurement results.

In some embodiments, a UE can report one indicator in IE NR-Multi-RTT-MeasElement-r16 to indicate the associated Rx and/or Tx timing delay of the reported UE Rx-Tx time difference. For example, a message design is shown below:

```
NR-Multi-RTT-MeasElement-r16 ::= SEQUENCE {
dl-PRS-ID-r16                         INTEGER (0..255),
nr-PhysCellID-r16                     NR-PhysCellID-r16
OPTIONAL,
nr-CellGlobalID-r16                   NCGI-r15
OPTIONAL,
nr-ARFCN-r16                          ARFCN-ValueNR-r15
OPTIONAL,
nr-DL-PRS-ResourceID-r16              NR-DL-PRS-ResourceID-r16
OPTIONAL,
nr-DL-PRS-ResourceSetID-r16               NR-DL-PRS-ResourceSetID-
r16                          OPTIONAL,
nr-UE-RxTxTimeDiff-r16                     CHOICE {
    k0-r16                            INTEGER (0..1970049),
    k1-r16                            INTEGER (0..985025),
    k2-r16                            INTEGER (0..492513),
    k3-r16                            INTEGER (0..246257),
    k4-r16                            INTEGER (0..123129),
    k5-r16                            INTEGER (0..61565),
    ...
},
```

-continued

| | |
|---|---|
| nr-AdditionalPathList-r16 | NR-AdditionalPathList-r16 |
| OPTIONAL, | |
| nr-TimeStamp-r16 | NR-TimeStamp-r16, |
| nr-TimingQuality-r16 | NR-TimingQuality-r16, |
| nr-DL-PRS-RSRP-Result-r16 | INTEGER (0..126) |
| OPTIONAL, | |
| nr-Multi-RTT-AdditionalMeasurements-r16 | |
| | NR-Multi-RTT-AdditionalMeasurements- |
| r16 OPTIONAL, | |
| IndicatorInfo | INTEGER (0...1) |
| OPTIONAL, | |
| ... | |
| } | |

In some embodiments, "IndicatorInfo" is a field defined used to indicate the associated Rx and/or Tx timing delay for the reported UE Rx-Tx time difference in this IE. In some embodiments, the field IndicatorInfo may take value 0 or 1. In some embodiments, the field IndicatorInfo may take value 0, 1, or 2. In some embodiments, the field IndicatorInfo may take values of 0, 1, 2, 3, or 4. In some embodiments, the field IndicatorInfo may take value 0 . . . maxN, where maxN may be reported in UE capability reporting.

In some embodiments, the UE may report a UE capability for measuring and reporting M sets of UE Rx-Tx time difference measurement results. For example, the UE may report a UE capability for supporting reporting multiple sets of UE Rx-Tx time difference measurements results that are associated with different UE Rx timing delay and/or UE Tx timing delay. In some embodiments, the UE may report the maximal number of sets. In some embodiments, the UE may report the supported number of sets. In some embodiments, the UE capability can be per-band. The benefit of per-band UE capability is that it may support the full flexibility of UE implementation. In some embodiments, the UE capability may be per band combination. The benefit of per-band combination is that it may support the full flexibility of UE implementation. In some embodiments, the UE capability may be for FR2. This embodiment may simplify the UE capability specification design.

Figure 8:
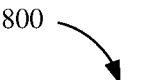
FIG. 8 shows an example block diagram of an apparatus for wireless communication, configured in accordance with embodiments of the present disclosure.

FIG. 8 shows an example block diagram of an apparatus 800, such as UE 106, for wireless communication, configured in accordance with embodiments of the present disclosure.

Embodiments described herein may be implemented into the apparatus using any suitable hardware and/or software configuration. In some embodiments, apparatus 800 includes a radio frequency (RF) circuitry 814, a baseband circuitry 812, an application circuitry 810, a memory/storage 816, a display 802, a camera 804, a sensor 806, and an input/output (I/O) interface 808, coupled with each other at least as shown in FIG. 8. In some embodiments, application circuitry 810 may include circuitry such as, but not limited to, one or more single-core or multi-core processors. The processors may include any combination of general-purpose processors and dedicated processors, such as graphics processors, application processors, etc. The processors may be coupled with memory/storage 816 and configured to execute instructions stored in the memory/storage to enable various applications and/or operating systems running on apparatus 800. For example, the processors may be any suitable hardware processor, such as an image processor, an image processing engine, an image-processing chip, a graphics-processor (GPU), a microprocessor, a micro-controller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component.

In some embodiments, baseband circuitry 812 may include circuitry such as, but not limited to, one or more single-core or multi-core processors. The processors may include a baseband processor. The baseband circuitry may handle various radio control functions that enable communication with one or more radio networks via RF circuitry 814. The radio control functions may include, but are not limited to, signal modulation, encoding, decoding, radio frequency shifting, etc. In some embodiments, baseband circuitry 812 may provide for communication compatible with one or more radio technologies. For example, in some embodiments, baseband circuitry 812 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 812 is configured to support radio communications of more than one wireless protocol may be referred to as multi-mode baseband circuitry.

In some embodiments, baseband circuitry 812 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

In some embodiments, RF circuitry 814 may enable communication with wireless networks using modulated electromagnetic radiation through a non-solid medium. In some embodiments, RF circuitry 814 may include switches, filters, amplifiers, etc., to facilitate the communication with the wireless network. In some embodiments, RF circuitry 814 may include circuitry to operate with signals that are not strictly considered as being in a radio frequency. In some embodiments, RF circuitry 814 may include circuitry to operate with signals having an intermediate frequency, which is between a baseband frequency and a radio frequency.

In some embodiments, the possible circuitry discussed above with respect to the UE, TRP, or gNB may be embodied in whole or in part in one or more of RF circuitry 814, baseband circuitry 812, and/or application circuitry 810. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of baseband circuitry 812, application circuitry 810, and/or memory/storage 816 may be implemented together on a system on a chip (SOC). In some embodiments, memory/storage 816 may be used to load and store data and/or instructions, for example, for UE 106.

In some embodiments, memory/storage 816 may include high-speed random access memory, such as DRAM, SRAM, or other random access solid state memory devices. In some implementations, memory/storage 816 includes non-volatile memory, such as one or more magnetic disk storage devices, optical disk storage devices, flash memory devices, or other non-volatile solid state storage devices. In some embodiments, memory/storage 816 includes one or more storage devices remotely located from the processors. In some implementations, memory/storage 816, or alternatively one or more storage devices (e.g., one or more nonvolatile storage devices) within memory/storage 816, includes a non-transitory computer readable storage medium. In some embodiments, memory/storage 816 or the computer readable storage medium of memory/storage 816 stores one or more computer program instructions, a database, or a subset thereof that are configured to perform one or more steps of one or more processes as discussed herein, e.g., with reference to FIGS. 1-7.

In some embodiments, I/O interface 808 may include one or more user interfaces designed to enable user interaction with the apparatus and/or peripheral component interfaces designed to enable peripheral component interaction with the apparatus. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In some embodiments, sensor 806 may include one or more sensing devices to determine environmental conditions and/or location information related to the apparatus. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In some embodiments, display 802 may include a display, such as a liquid crystal display and a touch screen display. In some embodiments, apparatus 800, e.g., the UE, may be a mobile computing device such as, but not limited to, a laptop computing device, a tablet computing device, a netbook, an ultrabook, a smartphone, an AR/VR glasses, etc. In some embodiments, apparatus 800 may have more or less components, and/or different architectures. Where appropriate, methods described herein may be implemented as a computer program. The computer program may be stored on a storage medium, such as a non-transitory storage medium.

Figure 9:
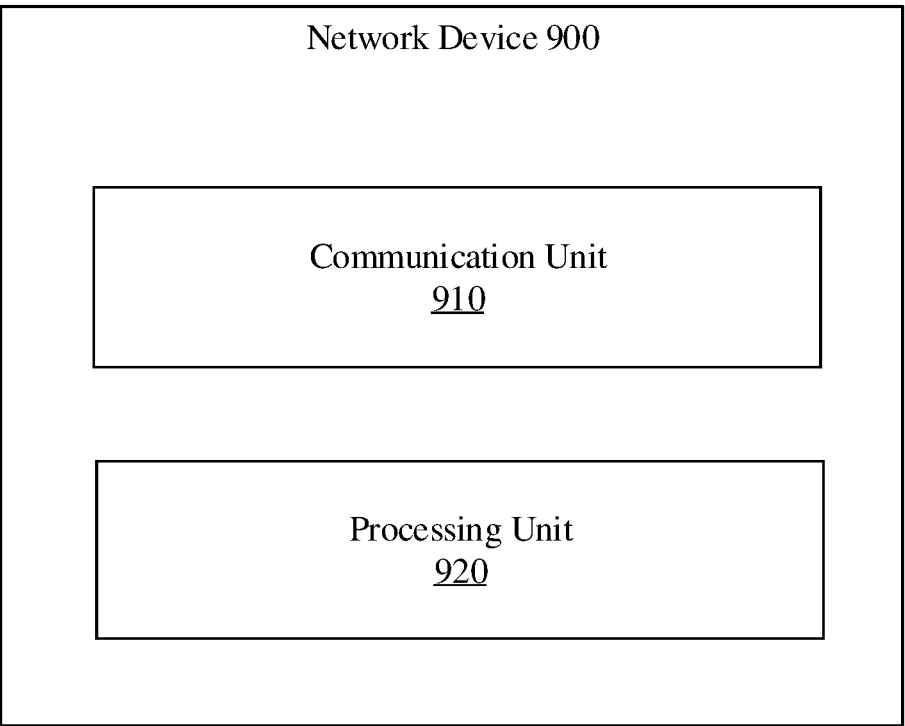
FIG. 9 shows an example block diagram of a network device for wireless communication, configured in accordance with embodiments of the present disclosure.

FIG. 9 shows an example block diagram of a network device 900, such as TRP 104-1, 104-2 . . . , TRP0, TRP1, TRP2, or TRP3, in FIGS. 1-3 and 5-6, for wireless communication, configured in accordance with embodiments of the present disclosure. Embodiments described herein may be implemented into the apparatus using any suitable hardware and/or software configuration. In some embodiments, network device 900 includes a communication unit 910 and a processing unit 920.

In some embodiments, communication unit 910 is configured to communicate with one or more components of apparatus 800 (e.g., UE 106) or LMF 102 as discussed herein. In some embodiments, communication unit 910 is configured to perform both uplink communication (e.g., UE 106 to TRP 104) and downlink communication (e.g., TRP 104 to UE 106). In some embodiments, communication unit 910 may be configured to transmit a beam using a first set of reference signal resources or a second set of reference signal resources. In some embodiments, communication unit 910 may be configured to transmit downlink control information (DCI) and/or Radio Resource Control (RRC) configuration information to configure UE 106.

In some embodiments, processing unit 920 is configured to control the overall functionality of network device 900, including that of communication unit 910. In some embodiments, processing unit 920 may control communication unit 910 to perform both uplink and downlink communications, as well as process signals received through the uplink transmissions. In some embodiments, processing unit 920 may be configured to control which set of reference signal resources are transmitted by communication unit 910.

It is to be understood that the disclosed embodiments are not necessarily limited in their application to the details of construction and the arrangement of the components set forth in the following description and/or illustrated in the drawings and/or the examples. The disclosed embodiments are capable of variations, or of being practiced or carried out in various ways. The types of user control as discussed in the present disclosure can be equally applied to other types of movable objects or any suitable object, device, mechanism, system, or machine configured to travel on or within a suitable medium, such as a surface, air, water, rails, space, underground, etc.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed apparatus, device, system, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

Units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If a software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in a computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

It will be apparent to those skilled in the art that various modifications and variations can be made to the disclosed devices and systems. Other embodiments will be apparent to those skilled in the art from consideration of the specification and practice of the disclosed devices and systems. It is intended that the specification and examples be considered as exemplary only, with a true scope being indicated by the following claims and their equivalents.

What is claimed is:

1. A method for providing positioning of a user equipment (UE), comprising:
   receiving, by the UE, configuration information for transmission of Sounding Reference Signal (SRS) resources for positioning associated with a higher layer parameter, wherein the higher layer parameter has a plurality of values in one-to-one correspondence to a plurality of transmit (Tx) timing offsets of the UE; and
   transmitting, from the UE, SRS resources for positioning associated with the higher layer parameter according to the configuration information to a plurality of transmission/reception points (TRPs), wherein the plurality of values of the higher layer parameter are used for calculating, by the plurality of TRPs, positioning measurements between the UE and the plurality of TRPs based on the plurality of Tx timing offsets of the UE, and wherein the calculated positioning measurements are used for determining the position of the UE,
   wherein the UE comprises a plurality of transmission antenna panels configured to transmit SRS resources at the plurality of Tx timing offsets.

2. The method of claim 1, wherein the UE is configured with one or more sets of SRS resources for positioning, and a respective set of SRS resources is configured with one or more SRS resources for positioning.

3. The method of claim 2, wherein respective ones of the SRS resources are associated with respective values of the higher layer parameter.

4. The method of claim 3, wherein the value of the higher layer parameter is included in a parameter of SRS resource in an NR Positioning Protocol A (NRPPa) protocol, or a parameter of a SRS-PosResource in a Radio Resource Control (RRC) protocol.

5. The method of claim 2, wherein a respective set of SRS resources is associated with one value of the higher layer parameter, and the one or more SRS resources in the respective set of SRS resource are associated with the same value of the higher layer parameter.

6. The method of claim 2, wherein each SRS resource for positioning is associated with one value of the higher layer parameter, or
   each set of SRS resources for positioning is associated with one value of the higher layer parameter, and every SRS resource in one set of SRS resources for positioning is associated with the same value of the higher layer parameter.

7. The method of claim 1, further comprising:
   reporting, by the UE, a UE capability for the higher layer parameter.

8. The method of claim 1, wherein the higher layer parameter includes a Radio Resource Control (RRC) parameter.

9. A user equipment (UE), comprising:
   a memory;
   at least one transceiver; and
   at least one processor communicatively coupled to the memory and the at least one transceiver, and configured to:
      receive configuration information for transmission of Sounding Reference Signal (SRS) resources for positioning associated with a higher layer parameter, wherein the higher layer parameter has a plurality of values in one-to-one correspondence to a plurality of transmit (Tx) timing offsets of the UE; and
      transmit SRS resources for positioning according to the configuration information to a plurality of transmission/reception points (TRPs), wherein the plurality of values of the higher layer parameter are used for calculating, by the plurality of TRPs, positioning measurements between the UE and the plurality of TRPs based on the plurality of Tx timing offsets of the UE, and wherein the calculated positioning measurements are used for determining the position of the UE,
      wherein the UE further comprises a plurality of transmission antenna panels configured to transmit SRS resources at the plurality of Tx timing offsets.

10. The UE of claim 9, wherein the UE is configured with one or more sets of SRS resources for positioning, and a respective set of SRS resources is configured with one or more SRS resources for positioning.

11. The UE of claim 10, wherein a respective set of SRS resources is associated with one value of the higher layer parameter, and the one or more SRS resources in the respective set of SRS resource are associated with the same value of the higher layer parameter.

12. The UE of claim 9, wherein respective ones of the SRS resources are associated with respective values of the higher layer parameter.

13. The UE of claim 12, wherein the value of the higher layer parameter is included in a parameter of SRS resource in an NR Positioning Protocol A (NRPPa) protocol, or a parameter of a SRS-PosResource in a Radio Resource Control (RRC) protocol.

14. The UE of claim 9, wherein the at least one processor is further configured to:

report a UE capability for the higher layer parameter.

15. A transmission/reception point (TRP), comprising:

a memory;

at least one transceiver; and at least one processor communicatively coupled to the memory and the at least one transceiver, and configured to:

receive, from a user equipment (UE), a Sounding Reference Signal (SRS) resource for positioning associated with a higher layer parameter, wherein the higher layer parameter has a value corresponding to a transmit (Tx) timing offset of the UE, wherein the UE comprises a plurality of transmission antenna panels associated with a plurality of Tx timing offsets;

calculate a positioning measurement between the UE and the TRP based on the SRS resource and according to the Tx timing offset of the UE; and report the calculated positioning measurement associated with the Tx timing offset to a location server for determining the position of the UE.

16. The TRP of claim 15, wherein the SRS resource is transmitted by a first transmission antenna panel associated with the Tx timing offset.

17. The TRP of claim 16, wherein the TRP has a plurality of receive (Rx) timing offsets associated with a plurality of receiving antenna panels or a plurality of Rx chains of the TRP.

18. The TRP of claim 17, wherein the positioning measurement includes an Uplink Relative Time of Arrival (UL RTOA) measurement measured from the SRS resource associated with the Tx timing offset.

19. The TRP of claim 18, wherein the at least one processor is further configured to:

report, to the location server, information of Tx timing offset at the UE applied to the SRS resource used for calculating an Uplink Relative Time of Arrival (UL RTOA) measurement.

20. The TRP of claim 19, wherein the information of Tx timing offset is included in a first index that indicates the Tx timing offset, or wherein the information of Tx timing offset is included in an SRS resource ID of the SRS resource used for calculating the positioning measurement, and wherein the location server derives the associated Tx timing offset according to the SRS resource ID.

* * * * *